United States Patent [19]
Maeda

[11] Patent Number: 5,915,263
[45] Date of Patent: Jun. 22, 1999

[54] MEMORY CONTROL DEVICE AND MEMORY DATA SEARCH CIRCUIT

[75] Inventor: Yasuaki Maeda, Kanagawa, Japan

[73] Assignee: Sony Corporation, Tokyo, Japan

[21] Appl. No.: 08/888,305

[22] Filed: Jul. 8, 1997

Related U.S. Application Data

[60] Continuation of application No. 08/560,868, Nov. 20, 1995, abandoned, which is a division of application No. 08/230,117, Apr. 20, 1994, abandoned.

[30] Foreign Application Priority Data

Apr. 23, 1993 [JP] Japan .................................. 5-119302

[51] Int. Cl.⁶ .................................................. G06F 12/00
[52] U.S. Cl. ............................ 711/154; 711/104; 707/3; 369/275.3
[58] Field of Search .................................... 711/154, 100, 711/104; 707/1, 3; 360/72.2; 369/275.3, 32, 33, 47, 54

[56] References Cited

U.S. PATENT DOCUMENTS

| | | | |
|---|---|---|---|
| 4,692,859 | 9/1987 | Ott | 340/825.65 |
| 4,811,203 | 3/1989 | Hamstra | 711/142 |
| 5,111,444 | 5/1992 | Fukushima et al. | 369/58 |
| 5,123,088 | 6/1992 | Kasahara et al. | 345/357 |
| 5,214,781 | 5/1993 | Miki et al. | 707/203 |
| 5,218,450 | 6/1993 | Nagai et al. | 386/70 |
| 5,253,337 | 10/1993 | Hirose | 345/357 |
| 5,255,272 | 10/1993 | Gill et al. | 371/40.3 |
| 5,265,230 | 11/1993 | Saldanha et al. | 711/161 |
| 5,295,124 | 3/1994 | Shirako | 369/32 |
| 5,325,347 | 6/1994 | Sako | 369/48 |
| 5,410,526 | 4/1995 | Maeda | 369/48 |

(List continued on next page.)

FOREIGN PATENT DOCUMENTS

| | | |
|---|---|---|
| 0 275 972 | 1/1988 | European Pat. Off. . |
| 0 281 415 | 3/1988 | European Pat. Off. . |
| 0 378 449 | 1/1990 | European Pat. Off. . |
| 0 399 853 | 5/1990 | European Pat. Off. . |
| 0 448 378 A2 | 3/1991 | European Pat. Off. . |
| 0 465 053 A3 | 6/1991 | European Pat. Off. . |
| 0 472 343 | 2/1992 | European Pat. Off. . |
| 0 506 471 | 9/1992 | European Pat. Off. . |
| 0 535 832 A1 | 9/1992 | European Pat. Off. . |
| 0 540 164 A1 | 9/1992 | European Pat. Off. . |
| 0 543 446 A1 | 11/1992 | European Pat. Off. . |
| 0 586 189 A2 | 8/1993 | European Pat. Off. . |
| 0 596 417 A2 | 10/1993 | European Pat. Off. . |
| 0 621 596 A2 | 4/1994 | European Pat. Off. . |
| 189933 | 7/1992 | Japan . |
| 5-89602 | 4/1993 | Japan . |
| 5-89643 | 9/1993 | Japan . |

OTHER PUBLICATIONS

"Concepts in Data Structures and Software Development," by G. Michael Scheider et al., West Publishing Company, Copyright 1991, pp. 141–145.

Patent Abstracts of Japan, vol. 17, No. 616 (P–1643), Publication No. JP 5189933, Published Jul. 30, 1993, Sony Corporation.

Electronics & Wireless World 93 91986) Oct. , No. 1608 Sutton, Surrey, Great Britain "IBM's PC Filing System" by Frances Stubbs, Ph.D.

*Primary Examiner*—Reginald G. Bragdon
*Attorney, Agent, or Firm*—Limbach & Limbach, LLP

[57] ABSTRACT

A memory controller is equipped with a memory data search circuit for carrying out an identifying operation of management information corresponding to a segment located in front of or behind a segment serving as a reference for an editing operation on a recording medium through search and comparison processing of managing information (U-TOC). The system controller does not receive search data and execute the data search but only sets the comparison standard and an initial value and outputs an execution control signal. The editing operation performed, reduces wasted space on a recording medium, such as a disc, and eliminates "trash areas" which are not addressable in the U-TOC.

4 Claims, 20 Drawing Sheets

U.S. PATENT DOCUMENTS

| | | | |
|---|---|---|---|
| 5,410,667 | 4/1995 | Belsan et al. | 711/114 |
| 5,434,991 | 7/1995 | Maeda et al. | 711/112 |
| 5,448,728 | 9/1995 | Takano et al. | 707/205 |
| 5,535,335 | 7/1996 | Cox et al. | 395/200.51 |
| 5,553,048 | 9/1996 | Maeda | 369/60 |
| 5,613,112 | 3/1997 | Nagashima | 707/200 |
| 5,659,529 | 8/1997 | Maeda et al. | 369/59 |
| 5,675,559 | 10/1997 | Maeda et al. | 369/32 |
| 5,829,050 | 10/1998 | Maeda | 711/171 |

FIG. 4A (PRIOR ART)

CORRESPONDING TABLE INDICATING
DATA PORTION (TABLE POINTER)

| P-DFA : 00h | P-EMPTY : (08h) | P-FRA : (01h) |
|---|---|---|
| P-TN01 : (02h) | P-TN02 : (04h) | P-TN03 : (03h) |
| P-TN04 : (07h) | P-TN05 : 00h | P-TN06 : 00h |
| P-TN07 : 00h | P-TN08 : 00h | P-TN09 : 00h |
| P-TN0253 : 00h | P-TN0254 : 00h | P-TN0255 : 00h |

FIG. 4B (PRIOR ART)

MANAGING TABLE PORTION
(255 PART TABLES)

| | START ADDRESS | END ADDRESS | TRACK MODE | LINK INFORMATION |
|---|---|---|---|---|
| (01h) | $A_7$ | $A_8$ | | (09h) |
| (02h) | $A_1$ | $A_2$ | | 00h |
| (03h) | $A_5$ | $A_6$ | | 00h |
| (04h) | $A_3$ | $A_4$ | | (06h) |
| (05h) | $A_{13}$ | $A_{14}$ | | 00h |
| (06h) | $A_{11}$ | $A_{12}$ | | 00h |
| (07h) | $A_9$ | $A_{10}$ | | (05h) |
| (08h) | 00h | 00h | | (0Ah) |
| (09h) | $A_{15}$ | $A_{16}$ | | 00h |
| (0Ah) | 00h | 00h | | (0Bh) |
| (0Bh) | 00h | 00h | | (0Ch) |
| (FEh) | 00h | 00h | | (FFh) |
| (FFh) | 00h | 00h | | 00h |

FIG. 7A (PRIOR ART)

CORRESPONDING TABLE INDICATING
DATA PORTION (TABLE POINTER)

| P-DFA : 00h | P-EMPTY : (08h) | P-FRA : (01h) |
|---|---|---|
| P-TN01 : (02h) | P-TN02 : (04h) | P-TN03 : (07h) |
| P-TN04 : (00h) | P-TN05 : 00h | P-TN06 : 00h |
| P-TN07 : 00h | P-TN08 : 00h | P-TN09 : 00h |
| P-TN0253 : 00h | P-TN0254 : 00h | P-TN0255 : 00h |

FIG. 7B (PRIOR ART)

MANAGING TABLE PORTION (255 PART TABLES)

| | START ADDRESS | END ADDRESS | TRACK MODE | LINK INFORMATION |
|---|---|---|---|---|
| (01h) | $A_{17}$ | $A_8$ | | (09h) |
| (02h) | $A_1$ | $A_2$ | | 00h |
| (03h) | — | — | — | 00h |
| (04h) | $A_3$ | $A_4$ | | (06h) |
| (05h) | $A_{13}$ | $A_{14}$ | | 00h |
| (06h) | $A_{11}$ | $A_{12}$ | | 00h |
| (07h) | $A_9$ | $A_{10}$ | | (05h) |
| (08h) | 00h | 00h | | (0Ah) |
| (09h) | $A_{15}$ | $A_{16}$ | | 00h |
| (0Ah) | 00h | 00h | | (0Bh) |
| (0Bh) | 00h | 00h | | (0Ch) |
| (FEh) | 00h | 00h | | (FFh) |
| (FFh) | 00h | 00h | | (03h) |

FIG. 9

| | | 16bit | | 16bit | | |
|---|---|---|---|---|---|---|
| | | MSB        LSB | MSB        LSB | MSB        LSB | MSB        LSB | |
| SYNC HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | 00000000 | 00000000 | 3 |
| | | 00000000 | 00000000 | 00000000 | 00000000 | 4 |
| | | 00000000 | 00000000 | 00000000 | 00000000 | 5 |
| | | "M" | "1" | "N" | "1" | 6 |
| | | Disc type | Rec power | First TNO | Last TNO | 7 |
| | | READ-OUT START ADDRESS (RO_A) | | | Used Sectors | 8 |
| | | POWER CALL AREA START ADDRESS (PC_A) | | | 00000000 | 9 |
| | | U-TOC START ADDRESS (UST_A) | | | 00000000 | 10 |
| | | RECORDABLE USER AREA START ADDRESS (RST_A) | | | 00000000 | 11 |
| CORRESPONDING TABLE INDICATING DATA PORTION | | 00000000 | P-TNO1 | P-TNO2 | P-TNO3 | 12 |
| | | P-TNO4 | P-TNO5 | P-TNO6 | P-TNO7 | 13 |
| | | P-TNO248 | P-TNO249 | P-TNO250 | P-TNO251 | 74 |
| | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| MANAGING TABLE PORTION (255 PART TABLES) | (01h) | START ADDRESS | | | TRACK MODE | 78 |
| | | END ADDRESS | | | 00000000 | 79 |
| | (02h) | START ADDRESS | | | TRACK MODE | 80 |
| | | END ADDRESS | | | 00000000 | 81 |
| | (03h) | START ADDRESS | | | TRACK MODE | 82 |
| | | END ADDRESS | | | 00000000 | 83 |
| | (FCh) | START ADDRESS | | | TRACK MODE | 580 |
| | | END ADDRESS | | | 00000000 | 581 |
| | (FDh) | START ADDRESS | | | TRACK MODE | 582 |
| | | END ADDRESS | | | 00000000 | 583 |
| | (FEh) | START ADDRESS | | | TRACK MODE | 584 |
| | | END ADDRESS | | | 00000000 | 585 |
| | (FFh) | START ADDRESS | | | TRACK MODE | 586 |
| | | END ADDRESS | | | 00000000 | 587 |

U-TOC SECTOR 0

FIG. 11

|  | 16bit | | 16bit | | |
|---|---|---|---|---|---|
|  | MSB     LSB | MSB     LSB | MSB     LSB | MSB     LSB | |
| SYNC { | 00000000 | 11111111 | 11111111 | 11111111 | 0 |
|  | 11111111 | 11111111 | 11111111 | 11111111 | 1 |
|  | 11111111 | 11111111 | 11111111 | 00000000 | 2 |
| HEADER { | ClusterH | ClusterL | 00000000 | 00000000 | 3 |
|  | 00000000 | 00000000 | 00000000 | 00000000 | 4 |
|  | 00000000 | 00000000 | 00000000 | 00000000 | 5 |
|  | 00000000 | 00000000 | 00000000 | 00000000 | 6 |
|  | Maker code | Model code | First TNO | Last TNO | 7 |
|  | 00000000 | 00000000 | 00000000 | Used Sectors | 8 |
|  | 00000000 | 00000000 | 00000000 | 00000000 | 9 |
|  | 00000000 | 00000000 | 00000000 | Disc serial No | 10 |
| CORRESPONDING TABLE INDICATING DATA PORTION { | Disc | ID | P-DFA | P-EMPTY | 11 |
|  | P-FRA | P-TNO1 | P-TNO2 | P-TNO3 | 12 |
|  | P-TNO4 | P-TNO5 | P-TNO6 | P-TNO7 | 13 |
|  | P-TNO248 | P-TNO249 | P-TNO250 | P-TNO251 | 74 |
|  | P-TNO252 | P-TNO253 | P-TNO254 | P-TNO255 | 75 |
|  | 00000000 | 00000000 | 00000000 | 00000000 | 76 |
|  | 00000000 | 00000000 | 00000000 | 00000000 | 77 |
| (01h) | START ADDRESS | | | TRACK MODE | 78 |
|  | END ADDRESS | | | LINK INFORMATION | 79 |
| (02h) | START ADDRESS | | | TRACK MODE | 80 |
|  | END ADDRESS | | | LINK INFORMATION | 81 |
| (03h) | START ADDRESS | | | TRACK MODE | 82 |
|  | END ADDRESS | | | LINK INFORMATION | 83 |
| MANAGING TABLE PORTION (255 PART TABLES) (FCh) | START ADDRESS | | | TRACK MODE | 580 |
|  | END ADDRESS | | | LINK INFORMATION | 581 |
| (FDh) | START ADDRESS | | | TRACK MODE | 582 |
|  | END ADDRESS | | | LINK INFORMATION | 583 |
| (FEh) | START ADDRESS | | | TRACK MODE | 584 |
|  | END ADDRESS | | | LINK INFORMATION | 585 |
| (FFh) | START ADDRESS | | | TRACK MODE | 586 |
|  | END ADDRESS | | | LINK INFORMATION | 587 |

U-TOC SECTOR 0

$Nref = N_2 - 1 \rightarrow A_{29} = A_{30} - 1$
MERGE PROCESSING NOT REQUIRED

MEMORY CONTROL DEVICE AND MEMORY DATA SEARCH CIRCUIT

This is a file wrapper continuing application under 37 CFR 1.62, of pending prior application Ser. No. 08/560,868 filed on Nov. 20, 1995 of YASUAKI MAEDA for MEMORY CONTROL DEVICE AND MEMORY DATA SEARCH CIRCUIT, now abandoned, which is a divisional patent application of application Ser. No. 08/230,117 filed on Apr. 20, 1994, of YASUAKI MAEDA for MEMORY CONTROL DEVICE AND MEMORY DATA SEARCH CIRCUIT, now abandoned.

FIELD OF INVENTION

This invention relates to a memory control device for use in a recording and reproducing apparatus, and in particular for use in apparatus capable of recording and reproducing audio data, such as music, on a disc-type recording medium, for example. More particularly, this invention relates to a memory data retrieve circuit which forms a part of the memory control device.

BACKGROUND OF THE INVENTION

Data rewritable disc media in which a user can record audio data, such as music, are well known. Such disc media are provided with a data area and managing area within the recordable area. The audio data is pre-recorded in the data area. The disc media is so designed that the managing data for these areas is rewritten every time a recording operation or an erasing operation for audio data is terminated. The managing area is typically referred to as the user TOC (Table of Contents), hereinafter referred to "U-TOC".

An audio recording apparatus is so designed that when an audio recording operation for a musical piece or song takes place a recordable area on a disc is located on the basis of the U-TOC information. The audio recording apparatus then records the audio data for the musical piece on this recordable area. On the other hand, the reproducing apparatus accesses the area in which audio data to be reproduced is recorded to carry out a reproducing operation for the musical piece identified from the U-TOC area.

Generally, for a recordable disc medium such as a magneto-optical (MO) disc or the like, random access recording can more easily be carried out in comparison with tape-type recording medium such as DAT (Digital Audio Tape), a compact cassette tape or the like. Also, it is not necessary to record a musical piece (audio data) on a continuous segment, that is, the program (the audio data for the musical piece) is discontinuously and discretely recorded in plural segments. As used herein, the term "segment" is defined as a track portion on which physically-continuous data is recorded.

Typically, in a system in which data is read out of a magneto-optical disc, this data is temporarily stored into a buffer memory (buffer RAM) at a high-speed rate, and then the data is read out as an audio reproducing signal from the buffer RAM at a low-speed rate to perform demodulation processing. Access between segments enables a reproduced musical piece to be outputted without being interrupted even if the data read-out operation from the magneto-optical disc is temporarily interrupted.

Accordingly, by repeating a recording or reproducing operation between the segments in a high-speed access operation, the recording or reproduction of a musical piece can be performed even when a track for the data of a musical piece is physically divided and separated into plural segments, on the condition that the access operation ends within a data reproducible time due to data accumulation caused by the difference between the write-in and read-out rates of the buffer RAM.

For example, as shown in FIG. 1, it is possible that the first and second audio data (musical songs) are both continuously recorded on a segment T1 and T2, while the fourth and fifth songs are discontinuously recorded on segments $T4_{(1)}$–$T4_{(4)}$ and $T5_{(1)}$–$T5_{(2)}$. FIG. 1 is an illustrative example. In practice, one segment frequently extends over several tracks to several hundreds of tracks.

When the recording, erasing or overwriting operation for musical pieces is repeated for the magneto-optical disc, empty areas are irregularly produced on the tracks due to the difference between play periods of musical pieces to be recorded and play periods of musical pieces to be erased. Through the above discrete recording operation (i.e., when a musical piece is discontinuously and discretely recorded on plural segments), any musical piece which is longer than one recordable segment can be recorded using more than one recordable segment, and thus the data recording area can be effectively used. Audio data to be recorded is not necessarily limited to "musical pieces", and any audio data may be used. In this specification, a block of data (a recording data unit) which has a linked content in combination is representatively defined as a "program" or musical piece.

When the recording operation is carried out for the above type of disc medium, the audio recording operation must be continuously carried out while accessing plural segments serving as recordable areas. When the reproducing operation is carried out, the segments must be accessed in such a manner that a piece of music is accurately and continuously reproduced. In order to satisfy such a requirement, both data for linking the segments allocated to a piece of music, for example, $T4_{(1)}$–$T4_{(4)}$ and data which indicates recordable areas, are stored as U-TOC information. Such information is rewritten as part of every recording, erasing, or overwriting operation as described above, and the recording/reproducing apparatus accesses the U-TOC information and stores it into the memory, for example, at the time when a disc is loaded. Further, when a recording, reproducing, erasing or overwriting operation or the like is carried out, a head access is carried out on the basis of the U-TOC information stored in the memory for the control thereof.

A recording track of the magneto-optical disc comprises continuously-formed clusters CL (1 cluster =36 sectors) each of which includes a subdata area of 4 sectors (one sector=2352 bytes) and a main data area of 32 sectors as shown in FIG. 2. One cluster serves as a minimum unit for the recording operation. One cluster has a length corresponding to two or three circumferences of the track. An address is recorded for every sector. The subdata area of 4 sectors is used for subdata or as a link area, and TOC data, audio data, etc. are recorded in the main data area of 32 sectors.

The sector is further divided into sound groups, and two sectors are divided into 11 sound groups. Data of 512 samples are recorded in a sound group while being separated into L(left) and R(right) channels. One sound group has audio data whose duration is 11.6 msec.

Next, an editing operation of the U-TOC in accordance with the audio recording, erasing, or overwriting operation will be described. FIG. 3 schematically shows the area structure of the disc in its radial direction. For a magneto-optical disc, the area structure is divided into a pre-mastered area and a groove area. The pre-mastered area is recorded with emboss pits which are represented as a pit area in FIG. 3 and a groove area which includes grooves and serves as a so-called magneto-optical area in FIG. 3.

A pre-mastered TOC (hereinafter referred to as "P-TOC") serves to manage information and is repetitively recorded in the pit area. In the P-TOC, the position of the U-TOC is indicated using a U-TOC start address $UST_A$, and, further, a read-out start address ROA, a start address of recordable user area $RST_A$, a power cal (calibration) area start address $PC_A$ are also indicated.

The groove area is formed subsequently to the pit area at the innermost peripheral side of the disc. Within the groove area, an area extending to the address which is indicated as the read-out start address $RO_A$ in the P-TOC is used as a recordable area, and subsequently is used as a read-out area.

A recordable user area of the recordable area, in which data is actually recorded, extends from the position (address $A_{MIN}$) indicated as a recordable user area start address $RST_A$ to the position (address $A_{MAX}$) just before the read-out start address $RO_A$. An area located before the recordable user area start address $RST_A$ in the group area is used as a managing area for recording and reproducing operations, and the U-TOC as described above, etc. are recorded in this area. An area whose length corresponds to one cluster is provided as a laser power calibration area from the position indicated as the power cal area start address $PC_A$.

The U-TOC is recorded at a predetermined position in the managing area for the recording or reproducing operations over three successive clusters, and the address position at which the U-TOC is recorded is indicated by the U-TOC start address $UST_A$. The U-TOC is provided with information on the recording status of the recordable user area as managing information.

Now, it is assumed that four pieces of music or audio data $M_1$ to $M_4$ are recorded in the recordable user area as shown in FIG. 3. That is, first audio data $M_1$ is recorded on segments having addresses $A_1$ (=$A_{MIN}$) to $A_2$, second music data $M_2$ is divided into a portion $M_{2(1)}$ which is recorded on segments having addresses $A_3$ to $A_4$, and a portion $M_{2(2)}$ which is recorded on segments having addresses $A_{11}$ to $A_{12}$. A third musical piece $M_3$ is recorded on segments having addresses $A_5$ to $A_6$, and a fourth musical piece $M_4$ is recorded so that it is divided into a portion $M_{4(1)}$ recorded on segments having addresses $A_9$ to $A_{10}$, and a portion $M_{4(2)}$ recorded on segments having addresses $A_{13}$ to $A_{14}$.

In this state, segments $F_{(1)}$ having addresses $A_7$ to $A_8$, and segment $F_{(2)}$ having addresses $A_{15}$ to $A_{16}$ (=$A_{MAX}$) are allocated to recordable areas on which no music data has been yet recorded, that is, recordable free areas.

This state (area structure) is managed as shown in FIG. 4 in the U-TOC. The U-TOC is provided with a corresponding table indicating data portion which includes various kinds of table pointers (P-DFA, P-EMPTY, P-FRA, P-TNO1 to P-TNO255) as shown in FIG. 4, and also with a managing table portion having 255 part tables (01h) to (FFh) in correspondence with the corresponding table indicating data portion. The numerical value affixed with an "h" are represented by hexadecimal notation. Each part table contains a start address, an end address, a track mode for one segment on the disc, and link information for linking the part table to another part table. In this construction, each part table is indicated by each kind of table pointer of the corresponding table indicating the data portion to thereby manage the segments.

The table pointer P-DFA indicates a defective area on the disc. Now, assuming that no defect exists in the recordable user area as shown in FIG. 3, the table pointer P-DFA is set to "00h". The table pointer P-EMPTY indicates an unused part table.

The table pointer P-FRA is used to manage free areas as recordable areas and, in the case of FIG. 4, the table pointer P-FRA indicates a part table (01h). Actually, each table pointer indicates a part table with a numerical value with which the address for the part table is determined through predetermined calculation processing.

Information in the free area $F_{(1)}$ (as shown in FIG. 3) is indicated in the part table (01h). That is, the addresses $A_7$ and $A_8$ are indicated as a start address and an end address, respectively. Further, since another segment serving as the free area $F_{(2)}$ exists, a part table (09h) is indicated by link information of the part table (01h). In practice, a numerical value with which the address for a part table is determined through predetermined calculation processing is indicated as link information.

In correspondence with the free area $F_{(2)}$, the addresses $A_{15}$ and $A_{16}$ are indicated as a start address and an end address respectively in the part table (09h). Since no further segment serving as a free area exists, this part table (09h) is not required to be linked to another part table, and thus the link information thereof is set to "00h".

Through the management of the free area as described above, the address for any segment serving as a free area can be obtained by searching part tables with the table pointer P-FRA being set to a starting point, and the music data or the like can be recorded on the segment serving as the free area. Music data which has already been recorded is managed in the same manner as described above. With respect to the musical pieces (music data), 255 musical pieces maximum can be managed by the table pointers P-TNO1 to P-TNO255.

With respect to the first musical piece $M_1$ for example, the start address $A_1$ and the end address $A_2$ therefor are indicated in a part table (02h) which is indicated by the table pointer P-TNO1 (02h). Since the musical piece $M_1$ is recorded on one segment, the link information of the part table (02h) is set to "00h".

Further, with respect to the second musical piece $M_2$, the start address $A_3$ and the end address $A_4$ therefor are indicated in a part table (04h) which is indicated by the table pointer P-TNO2. In this case, the musical piece $M_2$ is discontinuously recorded on two segments, and thus the addresses $A_3$ and $A_4$ indicate only one segment for the first half ($M_{2(1)}$) of the musical piece $M_2$. Accordingly, in this case, a part table (06h) is indicates the link information for the part table (04h), and the start address $A_{11}$ and the end address $A_{12}$ are recorded in the part table (06h) to indicate the other segment for the second half ($M_{2(2)}$). No further linkage is required for this musical piece, and thus the link information of the part table (06h) is set to "00h".

With respect to the third and fourth musical pieces $M_3$ and $M_4$, the positions of segments for these musical pieces are managed by those part tables which are obtained from the table pointers P-TNO3 and P-TNO4 serving as the respective starting points. In this case, since only four musical pieces are recorded, the table pointers P-TNO5 to P-TNO255 are not used and thus set to "00h".

The segment position of each musical piece is managed in the manner as described above, and thus the reproducing operation can be properly performed even when plural musical pieces are required to be reproduced in an irregular order or when each of the musical pieces are discontinuously recorded in two or more segments.

As described above, the table pointer P-EMPTY indicates an unused part table. In this case of FIG. 4, the table pointer P-EMPTY indicates a part table (08h). On the basis of the link information of the part table (08h), unused part tables which are linked to one another until an unused part table (FFh) serving as the last part table are managed by the link information. These unused part tables are subjected to the link management as shown in FIG. 4. The link information of the part table which is the last part table for the linked unused part tables, in this case, the part table (FFh), is set to "00h" to indicate no further linkage.

In the course of the recording/erasing operation of musical pieces or the like for this type of disc medium, wasted areas (trash areas), which are not managed by the U-TOC having the managing mode as described above, can occur. These trash areas are caused in the following ways. In order to prevent music data on another audio track from being erroneously erased when a piece of music (music data) is recorded, a guard band area whose length corresponds to several clusters may be provided before and after the music data. The sound-recording start position may be defined on the assumption that the sound recording is carried out on a cluster basis. The music editing involving partial erasure or synthesis of a musical piece (music data) may be carried out.

For example, in the case of FIG. 3, shaded portions between addresses $A_4$ to $A_5$, addresses $A_6$ to $A_7$ and addresses $A_{12}$ to $A_{13}$ are considered segments or addresses for trash areas which do not appear in the managing mode of the U-TOC as shown in FIG. 4. The occurrence of these trash areas causes a reduction in the recording capacity of the disc and expenditure of space in the part table. In order to solve this problem, it has been conventionally adopted that the U-TOC is re-edited at a prescribed time to reduce the trash areas. The editing processing of the U-TOC is executed, for example when music data is erased, or the re-editing of the U-TOC is instructed by an user's manipulation, or the control device determines an increase of trash areas.

The editing processing in accordance with the erasing operation will be described. It is assumed that the music data $M_3$ in the state of FIG. 3 is erased, as shown in FIG. 5. In this case, the segment of the music data $M_3$ is newly installed in a free area, and at the same time trash areas, as indicated by the shaded areas, located before and after the segment of music data $M_3$ are also created in the free area. Here, by combining the free area $F_{(1)}$ at the subsequent addresses $A_7$ to $A_8$ with the above free area, a new free area $F_{(1)}$ at addresses $A_{17}$ to $A_8$ can be formed, so that the trash areas at the addresses $A_4$ to $A_5$ and the addresses $A_6$ to $A_7$ can be erased. That is, the U-TOC may be rewritten so that the recordable user area can be newly managed by the U-TOC in the state of FIG. 6.

Accordingly, in such a recording apparatus, the state shown in FIG. 4 is rewritten to the state shown in FIG. 7 on the basis of the U-TOC information stored in the memory. The portions as indicated by oblique lines in FIG. 7 correspond to portions rewritten from the state of FIG. 4.

That is, the start address of the part table (01h) representing a free area $F_{(1)}$ is rewritten to the address $A_{17}$, and the music data $M_4$ is newly set as the music data $M_3$ because the previous music data $M_3$ has been erased. The data written in the table pointer P-TNO4 (that is, data indicating a part table (07h)) is written in the table pointer P-TNO3, and the table pointer P-TNO4 is set to "00h". Further, since the part table (03h) which previously indicated the segment for the music data $M_3$ is currently unused, it is linked subsequently to the part table (FFh) with the table pointer P-EMPTY set at a starting point, and it is managed as an unused part table. Through the editing of the U-TOC as shown in FIG. 7, the state of FIG. 6 can be realized.

In order to perform the above editing, the part tables in the U-TOC are required to be searched to judge whether adjacent segments before and after the segment of the recorded music data $M_3$ are located in an area in which music data is recorded or a free area in which no music data is recorded. In addition, it must be judged whether any trash area exists between the segment of the music data and the segments before and after the music data segment.

As is apparent from FIG. 4, any part table for a segment which is actually adjacent to a segment indicated by a part table on the disc cannot be identified from the part tables, and thus the following searching operation must be carried out. That is, the addresses of segments of all part tables are successively read in while compared with the address of a reference segment (segment of the erased music data $M_3$ in this case), and the segment having the nearest address is determined to be an adjacent segment.

Usually, this type of recording apparatus is provided with a memory controller for carrying out an output operation of memory write-in/read-out addresses and a stored data receiving operation for a memory for storing the U-TOC. A system controller (microcomputer) controls the memory controller to execute storage/read-out for data. The system controller reads in the U-TOC from the memory to control the actual recording operation, etc., and also carries out the editing operation of the U-TOC as described above. In order to perform the editing operation, the system controller carries out the searching operation for all the part tables through the memory controller as described above, and also carries out an address comparing operation for each searched part table to search adjacent segments.

Therefore, it takes a long time to perform data communication of the part tables from the memory (memory controller) to the system controller, and the communicating and comparing processing as described above imposes a significantly larger load on the system processing.

Particularly in a case where data reception and transmission between the memory controller and the system controller is carried out through serial communication, for example, when the processing for trash areas as described above is executed for the editing operation, the processing time requires two minutes at maximum, and this requirement for the processing time is unfavorable for practical use of the recording apparatus.

SUMMARY OF THE INVENTION

An object of this invention is to simultaneously realize increased speed-up of the editing processing of U-TOC and reduction of load imposed on a system controller for its processing.

In order to attain the above object, a memory control device for use in a recording apparatus is provided with a memory for reading out and storing managing data from a recording medium recorded thereon, with recording data and managing data for managing the recording data. The memory control device carries out recording or erasing operations for the recording medium on the basis of the managing data of the memory and edits the managing information in the memory in accordance with the recording or erasing operation to record the edited managing information on the recording medium at a predetermined point in time. The memory control device includes a memory controller for carrying out the outputting operation of write-in/ read-out addresses and the receiving operation of the write-in/read-out data for the memory. The memory control device further includes a system controller for controlling the memory controller to execute the data write-in/read-out operation for the memory.

The memory controller is provided with a memory data search circuit for searching managing information corresponding to a segment located before or after a segment on the recording medium which serves as a reference for the editing operation when the editing operation for the managing information is executed. The system controller is designed so that data of the segment on the recording medium, serving as the reference for the searching operation, and a search execution instruction, are transmitted to the memory data search circuit to execute the searching operation when the editing operation is carried out. The editing operation is controlled on the basis of the search result received from the memory data search circuit.

In addition to the above, when the managing information corresponding to the segment located before the segment on the recording medium, which serves as the reference for the editing operation, is searched by the memory data search circuit, the system controller controls the memory data search circuit to search for an end address of each segment in the managing information. When the managing information corresponding to the segment located after the segment on the recording medium which serves as the reference for the editing operation is searched for by the memory data search circuit, the system controller controls the memory data search circuit to search for a start address of each segment in the managing information.

The memory data search circuit which serves to search the managing data in the memory and is suitably equipped in the memory controller, includes a reference data register for holding reference data serving as a search reference. The memory data search circuit further includes an output selecting element for extracting search target data from data read out from the memory through the searching operation and outputting the extracted data. The memory data search circuit further includes a search data register for holding the search target data output from the output selecting element as search data. The memory data search circuit further includes a search target data position register element for holding position information in the managing information of the search target data in correspondence with the search target data output from the output selecting element. The memory data search circuit further includes a search data position register for holding the position information in the managing information of the search data in correspondence with the search data held in the search data register. The memory data search circuit further includes a first comparing element for comparing the reference data held in the reference data register and the search target data output from the output selecting element. The memory data search circuit further includes a second comparing element for comparing the search data held in the search data register and the search target data output from the output selecting element. The memory data search circuit further includes a renewing control element which holds in the search data register the search target data output from the output selecting element on the basis of the comparison result of the first and second comparing element to renew the search data in the search data register. The renewing control element also holds in the search data position register element the search target data position information which is held in the search target data position register to renew the search data position information in the search data position register element.

By providing the memory data search circuit which carries out the search and comparison processing of the managing information (U-TOC) in the memory controller to identify the managing information corresponding to a segment located before or after the segment on the recording medium, which serves as a reference for the editing operation, the search target data itself (that is, data of part tables in U-TOC) is not required to be transmitted to the system controller. Thus, the time which has been conventionally required for this data communication becomes unnecessary in the editing operation. Further, the processing of identifying adjacent segments through the data comparison also becomes unnecessary, so that the processing load on the system controller can be reduced.

BRIEF DESCRIPTION OF THE DRAWINGS

FIG. 4 illustrates the managing states of one example of recording data on a disc.

FIG. 7 is a schematic illustration of U-TOC edition processing following the erasure of recording data on the disc.

FIG. 9 is a schematic diagram of P-TOC information on a disc.

FIG. 11 is a schematic illustration of U-TOC information on the disc.

DETAILED DESCRIPTION OF CERTAIN PREFERRED EMBODIMENTS

An embodiment of a memory control device and a memory data search circuit according to this invention will be hereunder described with reference to FIGS. 8–12. This embodiment relates to a memory control device provided in a recording and reproducing apparatus when using a magneto-optical disc as a recording medium, and a memory data search circuit provided in the memory control device.

Figure 8:
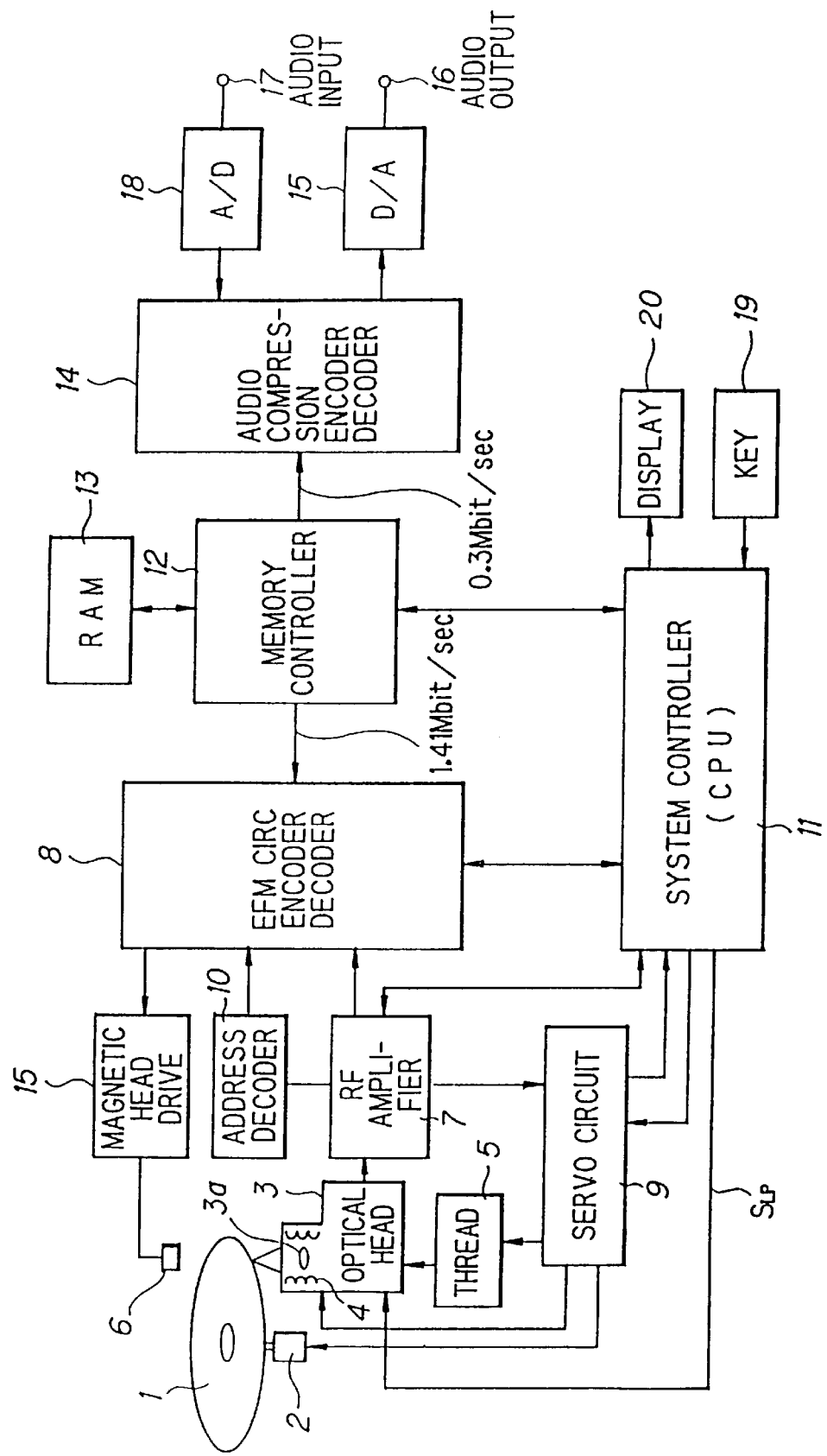
FIG. 8 is a block schematic diagram showing a recording and reproducing apparatus equipped with a memory control device and a memory data search circuit of an embodiment according to this invention.

FIG. 8 is a block diagram showing the recording and reproducing apparatus of the present invention. In FIG. 8, reference numeral 1 represents a magneto-optical disc on which audio data such as a musical piece or the like is recorded, and it is rotationally driven by a spindle motor 2. Reference numeral 3 represents an optical head for irradiating a laser beam onto the magneto-optical disc 1 in recording/reproducing operations. In the recording operation, the optical head outputs a high-level laser beam to heat recording tracks up to the Curie temperature, and in the reproducing operation the optical head outputs a relatively-low level laser beam to detect data from reflected light through the magnetic Kerr effect.

The optical head 3 is equipped with a laser diode, an optical system comprising a deflection beam splitter, an objective lens, etc., and a detector for detecting reflected light. The objective lens 3a is supported by a biaxial mechanism 4 which is displaceable so it can be moved to and away from disc 1.

Reference numeral 6 represents a magnetic head for supplying the magneto-optical disc with a magnetic field which is modulated by supplied data signal, and it is disposed opposite the optical head 3 with respect to the magneto-optical disc 1. The optical head 3 and the magnetic head 6 are movable in the radial direction of the disc by a thread mechanism 5.

Information which is detected from the magneto-optical disc 1 by the optical head 3 in the reproducing operation is supplied to an RF amplifier 7. The RF amplifier 7 conducts calculation processing on the supplied information to extract a reproduction RF signal, a tracking error signal, a focus error signal, an absolute position information signal (absolute position information recorded as a pregroup, wobbling group, on the magneto-optical disc 1), an address information signal, and a focus monitor signal. The extracted reproduction RF signal is supplied to an encoder/decoder unit 8. The tracking error signal and the focus error signal are supplied to a servo circuit 9, and the address information is supplied to an address decoder 10. The absolute position information and the focus monitor signal are supplied to a system controller 11 comprising a microcomputer.

The servo circuit 9 generates servo driving signals on the basis of the supplied tracking error signal and focus error signal, an auto music sensor instruction signal, a seek instruction, a rotational speed detection signal of a spindle motor, which are supplied from the system controller 11, and controls the biaxial mechanism 4 and the thread mechanism 5 to perform focus and tracking control. Further, the servo circuit 9 controls the spindle motor 2 at a constant angular velocity (CAV) or a constant linear velocity (CLV).

The reproduction RF signal is subjected to a decoding processing such as EFM (Eight Fourteen Modulation) demodulation, CIRC (Cross Interleaved Reed-Solomon Coding) or the like in the encoder/decoder unit 8, and then it is temporarily written in a buffer RAM 13 by the memory controller 12. The data read-out operation from the magneto-optical disc 1 by the optical head 3 and the transmission of reproduced data in a system which extends from the optical head 3 to the buffer RAM 13 are carried out intermittently at 1.41 Mbit/sec.

The data written in the buffer RAM 13 is read out at such a timing that the transmission of the reproduced data is carried out at 0.3 Mbit/sec, and supplied to the encoder/decoder unit 14. Thereafter, the data is subjected to reproduction signal processing such as decode processing for an audio compression processing, converted to analog signals by a D/A converter 15, and the analog signal is supplied to a prescribed amplifier circuit from a terminal 16 to be output as audio signals, for example, Left channel (L) and Right channel (R) audio signals.

The data write-in/read-out for the buffer RAM 13 is carried out using address indication through the control of the write-in pointer and the read-out pointer by the memory controller 12. The write-in pointer (write-in address) is incremented at 1.41 Mbit/sec timing as described above, and the read-out pointer (read-out address) is incremented at 0.3 Mbit/sec timing. Therefore, the buffer RAM 13 is kept in such a state that an amount of data is accumulated in the buffer RAM 13 due to the difference in bit rate between the write-in and the read-out operations. At the time when full capacity of data is accumulated in the buffer RAM 13, the increment of the write-in pointer is stopped, and the data read-out operation from the magneto-optical disc 1 by the optical head 3 is also stopped. However, the increment of the read-out pointer is continued, and thus the reproduced audio output is not interrupted.

Thereafter, assuming that the read-out operation from the buffer RAM 13 is further continued and the data accumulation amount in the buffer RAM 13 is decreased below a predetermined amount, the increment of the data read-out operation and the increment of the write-in pointer W by the optical head 3 are resumed, and the data accumulation into the buffer RAM 13 is resumed.

By outputting the reproduced sound signal through the buffer RAM 13 in the manner as described above, the reproduced audio output may be interrupted even when the tracking deviates due to external disturbances or the like, and by accessing an accurate tracking position before the accumulated data is used up and resuming the data read-out operation, the reproducing operation can continue with no affection on the reproduction output. Consequently, shock-proof operation can be remarkably improved.

In FIG. 8, the address information output from the address decoder 10 and sub code data for the control operation are supplied through the encoder/decoder unit 8 to the system controller 11, and used for various control operations. Further, the system controller 11 is supplied with a lock detection signal of a PLL (phase locked loop) circuit for generating bit clocks for the recording/reproducing operations and a monitor signal for monitoring a lack state of a frame sync signal of the reproduction data, Left and Right channels.

The system controller 11 outputs a laser control signal SLP for controlling the operation of the laser diode of the optical head 3, and it serves to carry out ON/OFF control of the output of the laser diode. At the ON-control time, the system controller 11 switches the laser power between the relatively low level output in the reproducing operation and the relatively high level output in the recording operation.

When the recording operation is conducted on the magneto-optical disc 1, the recording signal (analog audio signal) supplied to the terminal 17 is converted to digital data by an A/D converter 18, and then supplied to the encoder/decoder unit 14 to be subjected to audio compression encode processing. The recording data compressed by the encoder/decoder unit 14 is temporarily written in the buffer RAM 13 by the memory controller 12, and then read out at a prescribed timing to be transmitted to the encoder/decoder unit 8. In the encoder/decoder unit 8, the data is subjected to an encode processing such as CIRC encode, EFM modulation, etc., and then supplied to a magnetic head driving circuit 15.

The magnetic head driving circuit 15 supplies the magnetic head 6 with a magnetic head drive signal in accordance with the recording data which has been subjected to the encode processing. That is, application of N or S magnetic field to the magneto-optical disc 1 by the magnetic head 6 is executed. At this time, the system controller 11 supplies a control signal to output laser beam having a recording level to the optical head.

A reference numeral 19 represents an operation input unit provided with keys which are manipulated by a user, and a reference numeral 20 represents a display unit comprising a liquid crystal display, for example. The operation input unit 19 is provided with a sound-recording key, a reproducing key, a stop key, an AMS (auto music scan) key, a search key, etc. for user's manipulation.

When the recording/reproducing operation is conducted on the disc 1, managing information recorded on the disc 1, that is, P-TOC and U-TOC are read out, and in accordance with the managing information, the system controller 11 identifies the addresses of segments to be recorded on the disc 1 and the addresses of segments to be reproduced. This managing information is held in the buffer RAM 13. Therefore, the buffer RAM 13 is divided into a buffer area for the recording data/reproducing data, and an area for the managing information.

The system controller 11 executes the reproducing operation for the innermost peripheral side of the disc having the managing information recorded thereon at the time when the disc 1 is installed, thereby reading out the managing information, and stores it into the buffer RAM 13, whereby the managing information is allowed to be referred to later for the recording/reproducing operations.

The U-TOC is edited in accordance with the recording, erasing, or overwriting operation of data. If occasion demands, the U-TOC is edited with a merge processing for removing trash areas as described above to be rewritten as a new one. The system controller 11 conducts this editing processing on the U-TOC information stored in the buffer RAM 13 for every recording, erasing or overwriting operation. Through the above rewriting operation, it can rewrite an U-TOC area on the disc 1 at a prescribed timing.

Here, the P-TOC and the U-TOC on the disc 1 will be described. The P-TOC information is used to indicate recordable areas (recordable user area, etc.) on the disc and management of the U-TOC area. When the disc 1 comprises a premastered disc which is an optical disc exclusively used for reproduction, music data which is fixedly recorded (like ROM) by P-TOC can be managed.

The format of the P-TOC is shown in FIG. 9. FIG. 9 shows one segment (sector 0) for P-TOC information which is repetitively recorded in an area used for P-TOC, for example, in a ROM area at the innermost peripheral side of the disc 1.

The data area for the sector of the P-TOC comprises 4 bytes×588 (=2352 bytes), and at the head position of the data area is provided as a header with a sync pattern of one byte data for all "0" or all "1", and addresses representing a cluster address and a sector address, etc., thereby indicating the P-TOC area. Subsequently, an identification ID of ASCII corresponding to a letter "MINI" is added at a predetermined address position.

Subsequently, a disc type, a sound recording level, the number of a first recorded music data (musical piece) (First TNO), the number of a last recorded music data (musical piece) (Last TNO), a read-out start address ROA, a power cal area start address $PC_A$, a start address $UST_A$ of U-TOC (data area of U-TOC sector 0 of FIG. 15 as described later), a start address $RST_A$ for a recordable area, as recorded.

Figure 1:
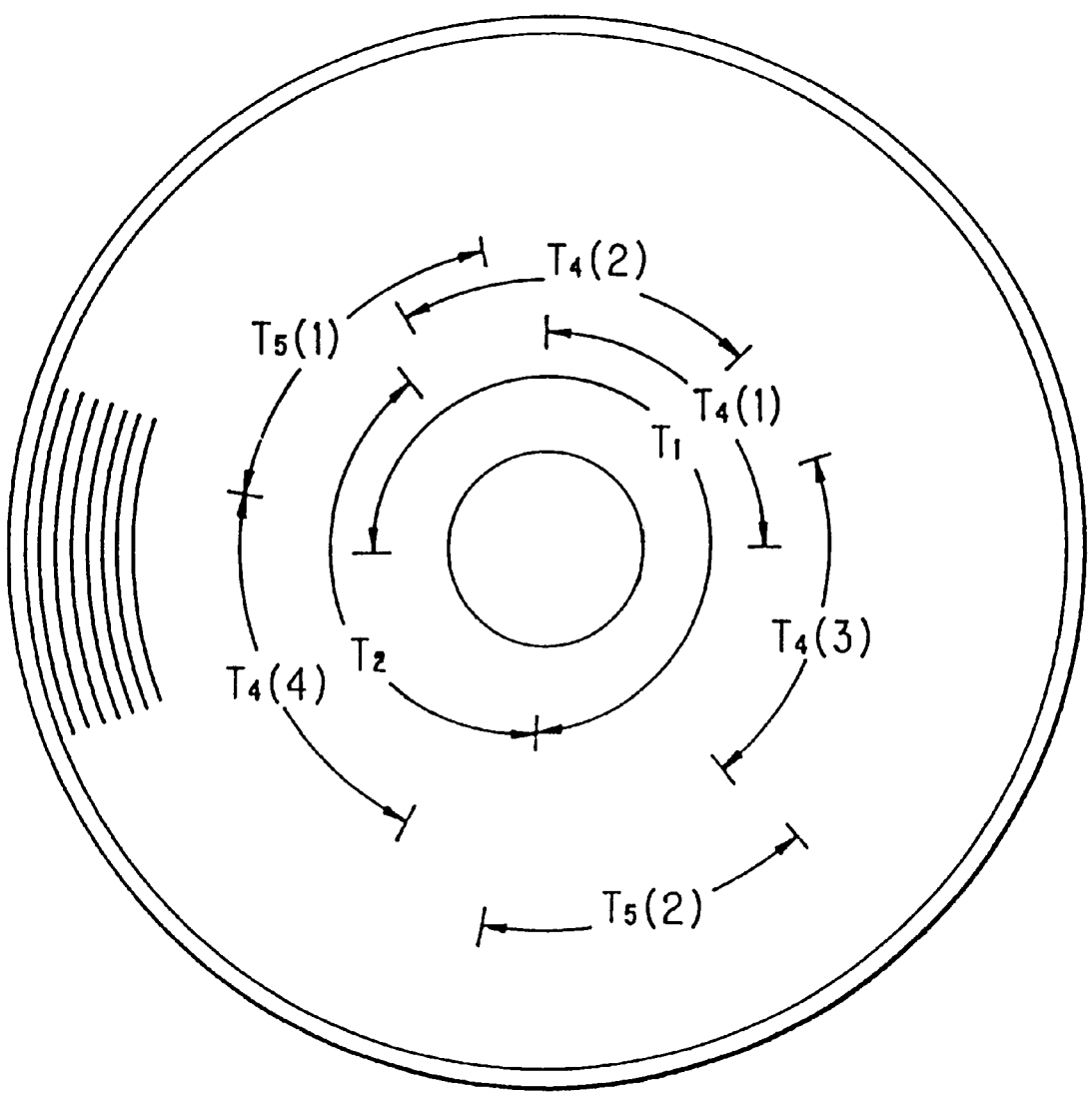
FIG. 1 is a schematic view of a segment-dividable recordable disc.
Figure 2:
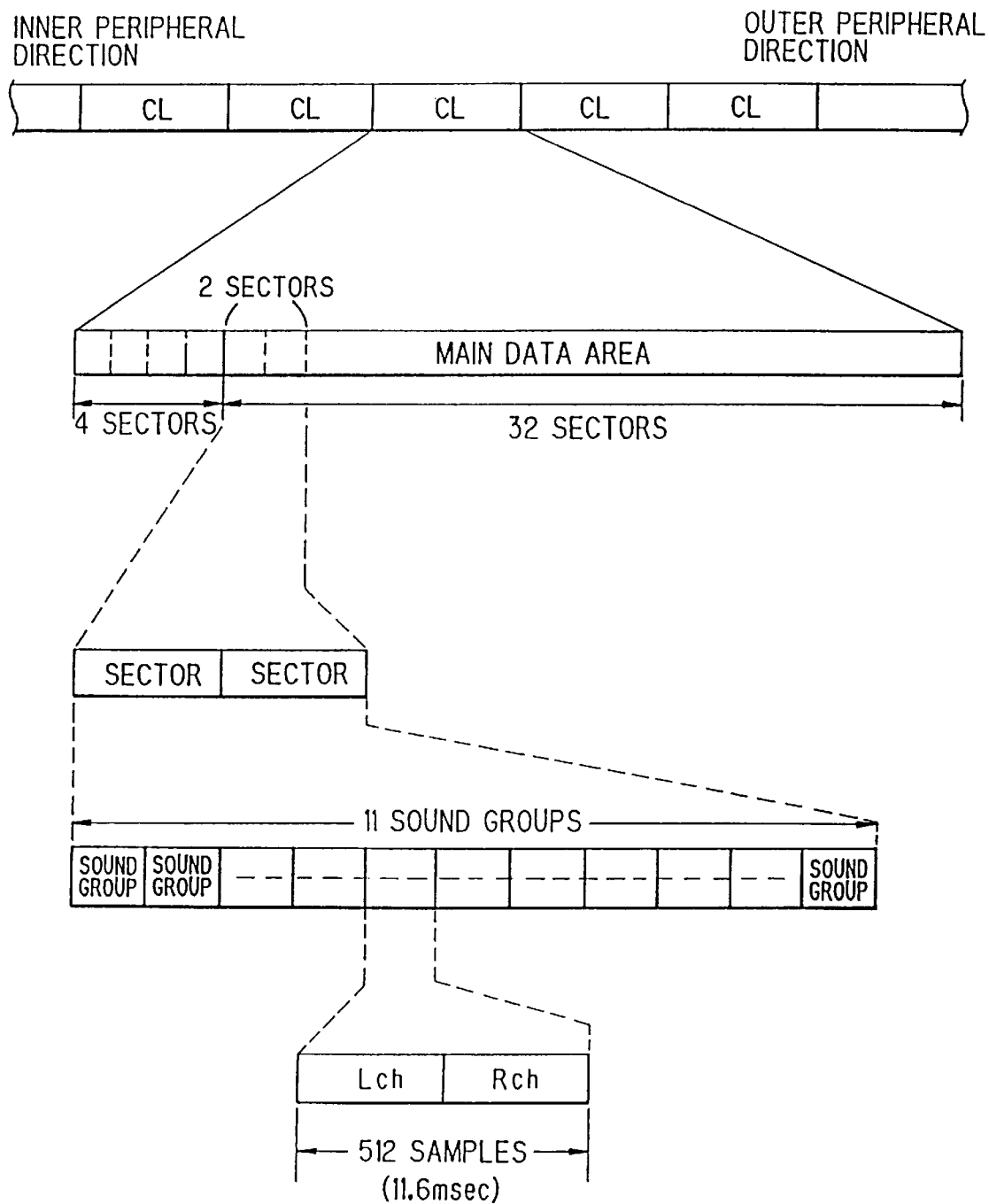
FIG. 2 is a schematic illustration of a track format of a disc.
Figure 3:
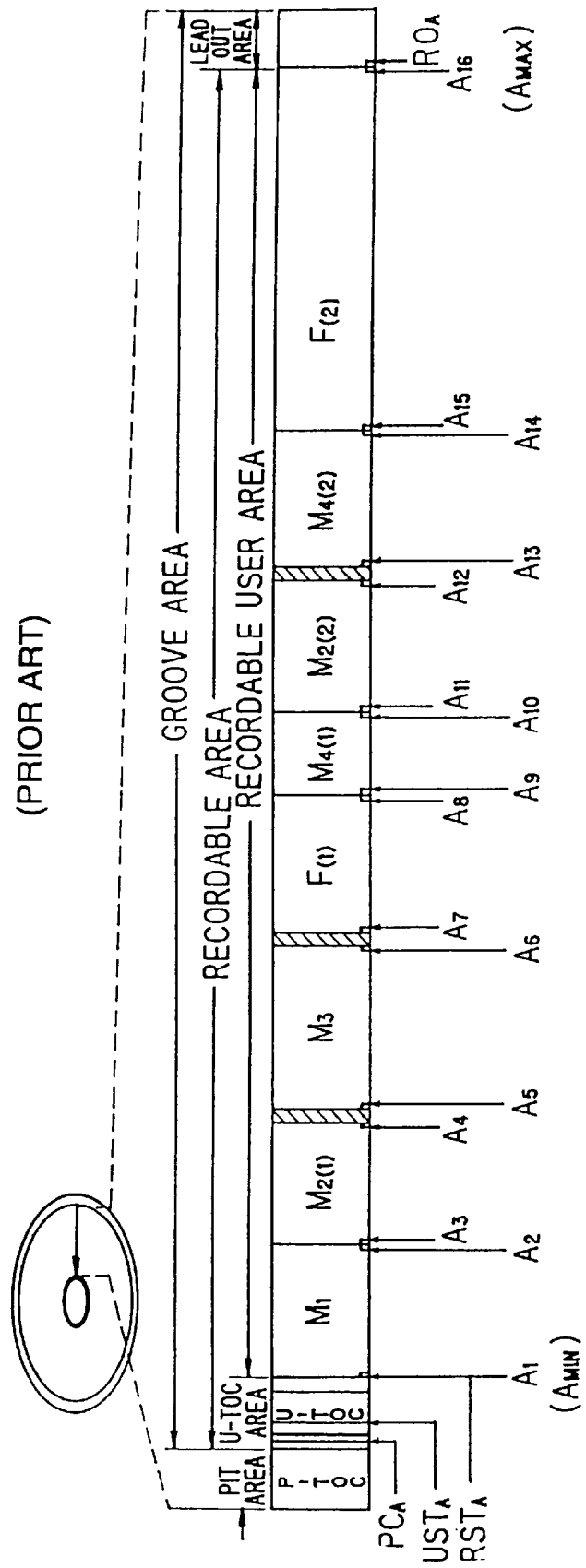
FIG. 3 is a schematic view partially exploded of an area state of a disc taken in a radial direction along the disc.
Figure 5:
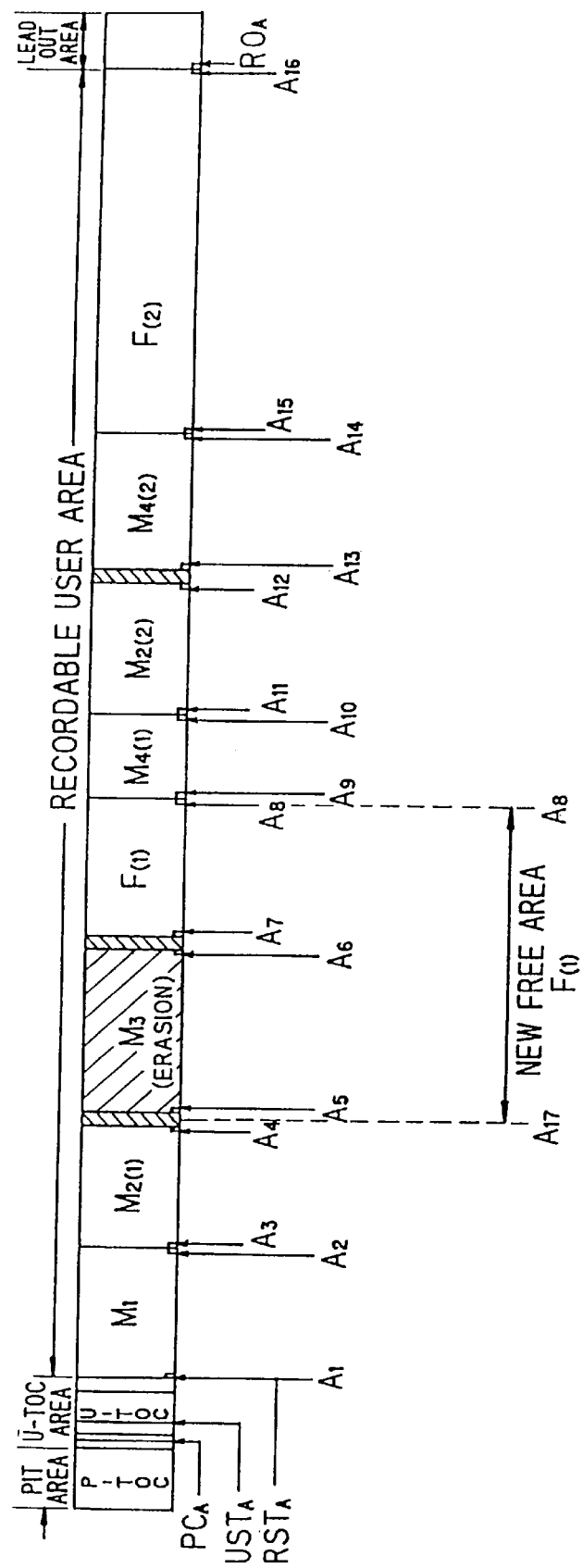
FIG. 5 is a schematic illustration of data processing following erasure of recording data on the disc.
Figure 6:
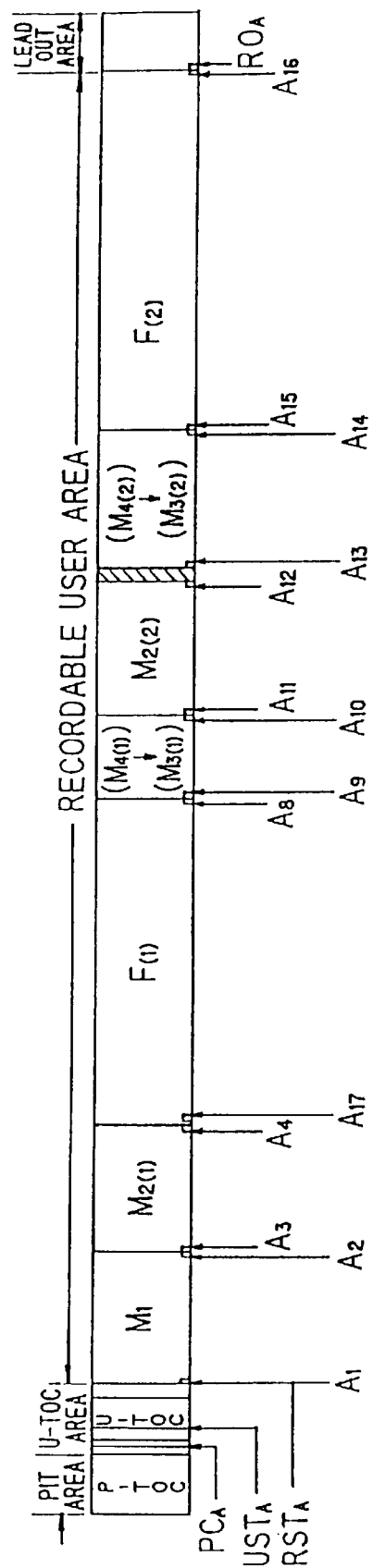
FIG. 6 is another schematic illustration of data processing after erasing recording data on the disc.
Figure 10A:
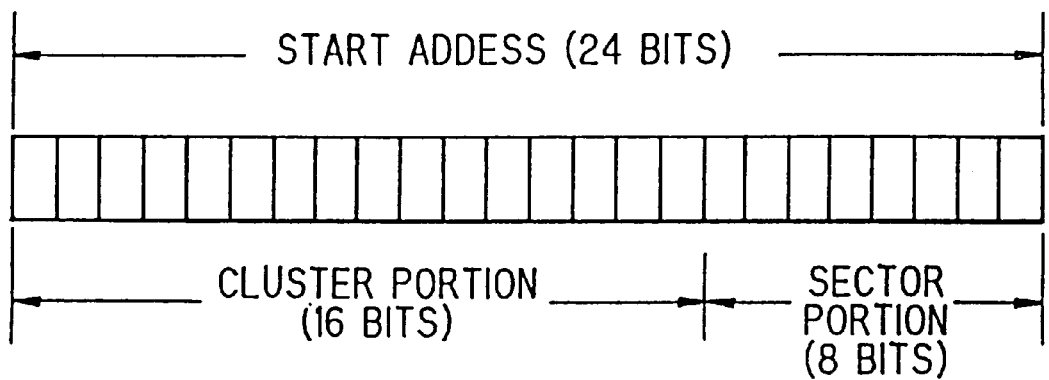
FIGS. 10A and 10B are schematic views of an address data format of the P-TOC and U-TOC information, respectively, on the disc.
Figure 10B:
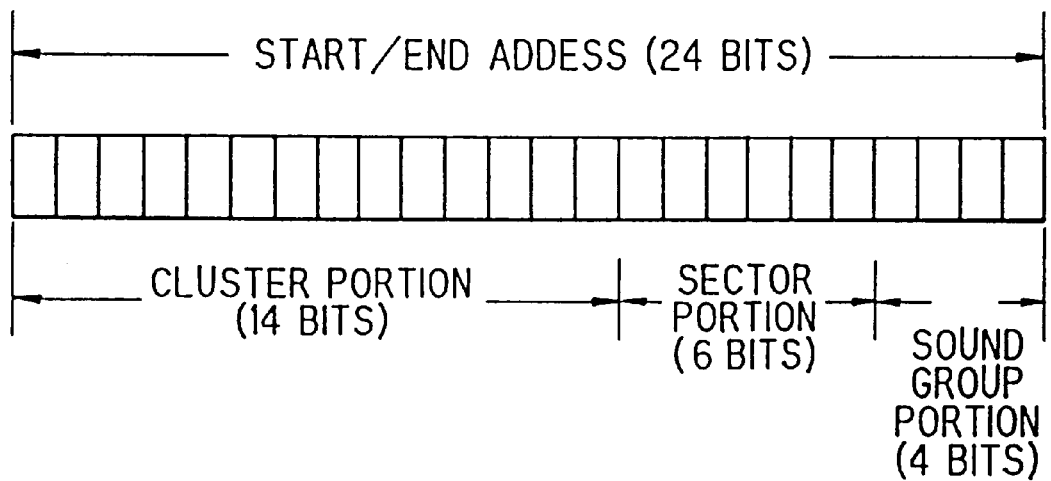

The start addresses of 24 bits (3 bytes) are divided into upper digits of 16 bits which are used as a cluster address, and lower digits of 8 bits which are used as a sector address as shown in FIG. 10A, and as shown in FIG. 3, the area management on the disc 1 is carried out by these start addresses as described above.

Further, there is provided a corresponding table indicating data portions having table pointers (P-TNO1 to P-TNO255) for corresponding recorded music data (musical pieces) to part tables in a managing table portion as described later.

Further, in a subsequent area to the corresponding table indicating data portion is provided a managing table portion which is equipped with 255 part tables of (01h) to (FFh) in correspondence with the table pointers (P-TNO1 to P-TNO255) in the corresponding table indicating data portion (the numerical value affixed with "h" are represented by hexadecimal notation). Each part table is so designed that a start address serving as a starting point for a segment, an end address serving as an end point for the segment, and mode information (track mode) for the segment (track) are recordable.

As the mode information for the track in each part table are recorded information as to whether the segment is set to an over-write inhibition or data copy inhibition mode, information as to whether it is audio information, an identification information of monaural/stereo, is provided.

The segment content of each of the part tables from (01h) to (FFh) in the managing table portion is indicated by each of the table pointers (P-TNO1 to P-TNO255) of the corresponding table indicating data portion. That is, for the first music data (the first musical piece), a part table is indicated (for example (01h)). Actually, in the table pointer a numeric value is recorded with which a part table can be indicated at a byte position within the P-TOC sector 0 by a prescribed calculation processing is recorded as the table pointer P-TNO1. In this case, the start address of the part table (01h) becomes a start address for the recording position of the music data of the first musical piece, and similarly the end address becomes an end address for the recording position of the music data of the first musical piece. Further, the track mode information becomes information for the first musical piece.

The start address/end addresses of 24 bits (3 bytes) in the part table are divided into upper digits of 14 bits which serve as a cluster address, subsequent 6 bits which serve as a sector address, and subsequent lower digits of 4 bits which serve as a sound group address. (See Fig. 10B.)

Likewise, for a second musical piece, a start address, an end address and track mode information for the recording position of the second musical piece are recorded in the part table (for example (02h) as indicated by the table pointer P-TNO2. Likewise, table pointers until P-TNO255 are provided, and the musical pieces until a 255th musical piece can be managed on the basis of the P-TOC. By forming the P-TOC sector 0 as described above, a predetermined musical piece can be accessed and reproduced, for example.

As described later, a disc which is subjected to the editing operation of U-TOC is a recordable/reproducible magneto-optical disc. In this case, a so-called premastered music data area is not provided on the disc, and thus the corresponding table indicating data portion and the managing table portion as described above are not used. These are managed by U-TOC as described later. Therefore, all the bytes are set to "00h".

However, for a hybrid type of disc having both a ROM area and magneto-optical area on which music data and other data are recorded, the music data in the ROM area is managed using the corresponding table indicating data portion and the managing table portion.

Next, the U-TOC will be described. FIG. 11 shows the format of one sector of the U-TOC. It is used as a data area for recording audio information such as a musical piece through a user's sound-recording. It is used for managing information on unrecorded areas (free areas) on which music data is newly recorded.

For example, when a piece of music is recorded on disc 1, the system controller 11 searches a free area on the disc on the basis of the U-TOC, and records the music data of the musical piece on a free area it has located. Further, in the reproducing operation, the system controller 11 identifies an area in which music data to be reproduced is recorded, and accesses the area to perform the reproducing operation.

Like the P-TOC, a sector (sector 0) of the U-TOC as shown in FIG. 11 is first provided with a header, and subsequently with data of a maker code, a model code, the number of a first track (First TNO), the number of a last track (Last TNO), a sector use status, a disc serial number, a disc ID, at predetermined address positions, respectively. Further, it is provided with an area on which various kinds of table pointers (P-DFA, P-EMPTY, P-FRA, P-TNO1 to P-TNO255) are recorded as the corresponding table indicating data portion to identify areas for musical pieces which have been recorded through the user's sound recording system, and unrecorded areas by corresponding these areas to the managing table portion as described later.

Further, 255 part tables from (01h) to (FFh) are provided as the managing table portion corresponding to the table pointers (P-TNO1 to P-TNO255) of the corresponding table indicating data portion, and in each part table are recorded a start address serving as a starting point for a segment, an end address serving as an end point for the segment and mode information (track mode) for the segment, like the P-TOC sector 0 as shown in FIG. 9. Further, for the U-TOC sector 0, there may occur a case where a segment indicated in each part table is linked to another segment, and thus the U-TOC sector 0 is so designed that the link information for indicating a part table in which the start and end addresses for the linked segment are recorded.

The start address/end address of 24 bits (3 bytes) in the part table are divided into upper digits of 14 bits which serve as a cluster address, subsequent 6 bits which serve as a sector address, and subsequent lower digits of 4 bits which serve as a sound group address.

As described above, in this type of recording and reproducing apparatus, even when music data is physically discontinuously recorded, that is, it is recorded over plural segments, the reproducing operation is carried out while access between the segments is carried out, so that the reproducing operation can be carriedrecorded through thece. With respect to a music piece or the like which is recorded through the user's sound recording system, for the purpose of effective use of recordable areas, it may be discontinuously recorded over plural segments. Therefore, the link information is provided, and, by indicating a part table to be linked on the basis of one of the numbers (01h) to (FFh) allocated to the respective part tables the linkage of the part tables can be performed. Actually, they are provided as numerical values which correspond to the byte positions in the U-TOC sector 0 through the prescribed calculation processing. Ordinarily, each of the music pieces which are recorded beforehand is not subjected to segment division, and the link information thereof is set to "(00h)" in the P-TOC sector 0 as shown in FIG. 9.

Thus, in the managing table portion of the U-TOC sector 0, one part table represents one segment, and for a music data comprising three linked segments, the positions of these segments are managed by the three part tables which are linked to each other with the link information.

The segment contents of the respective part tables from (01h) to (FFh) in the managing table portion of the U-TOC sector 0 are represented by the table pointers (P-DFA, P-EMPTY, P-FRA, P-TNO1 to P-TNO255) in the corresponding table indicating data portion.

The table pointer P-DFA is provided for indication of a defective area on the magneto-optical disc 1, and indicates a part table or a head part table of plural part tables in which a track portion (=segment) serving as a defective area due, for example, to a scratch is indicated. That is, when any defective segment exists, any one of (01h) to (FFh) is recorded in the table pointer P-DFA, and the defective segment is indicated with start and end addresses in the corresponding part table. When another defective segment exists, the defective segment is indicated by the link information for the part table, and the defective segment is indicated in that part table. When no other defective segments exist, the link information is set to "(00h)", and no subsequent linkage is indicated.

The table pointer P-EMPTY indicates an unused part table or a head part table of plural unused part tables. When any unused part table exists, any one of (01h) to (FFh) is recorded as the table pointer P-EMPTY. When plural unused part tables exist, the part tables are successively indicated from the part table indicated by the table pointer P-EMPTY on the basis of the link information, and all of the unused part tables are linked with one another on the managing table portion.

For example, for a magneto-optical disc on which no audio data such as music data is recorded and no defect exists, the pointer designation which is used is P-FRA. For example, if a part table (01h) is indicated by the table pointer P-FRA, then a part table (02h) is subsequently indicated with the link information of the part table (01h), and then a part table (03h) is subsequently indicated with the link information of the part table (02h). This linking operation is repeated until the linkage to the part table (FFh) is carried out. In this case, the link information of the part table (FFh) is set to "(00h)" which represents no subsequent linkage.

The table pointer P-FRA represents a free area, containing an erased area, in which data can be written on the magneto-optical disc 1, and indicates a part table or a head part table of plural part tables in which a track portion (=segment) serving as a free area is indicated. That is, when any free area exists, any of (01h) to (FFh) is recorded in the table pointer P-FRA, and a segment serving as a free area is indicated with its start and end addresses in the corresponding part table. Further, when a plurality of segments as described above exist, that is, plural part tables exist, the part tables are successively indicated on the basis of the link information until the part table whose link information is set to "(00h)".

Figure 12:
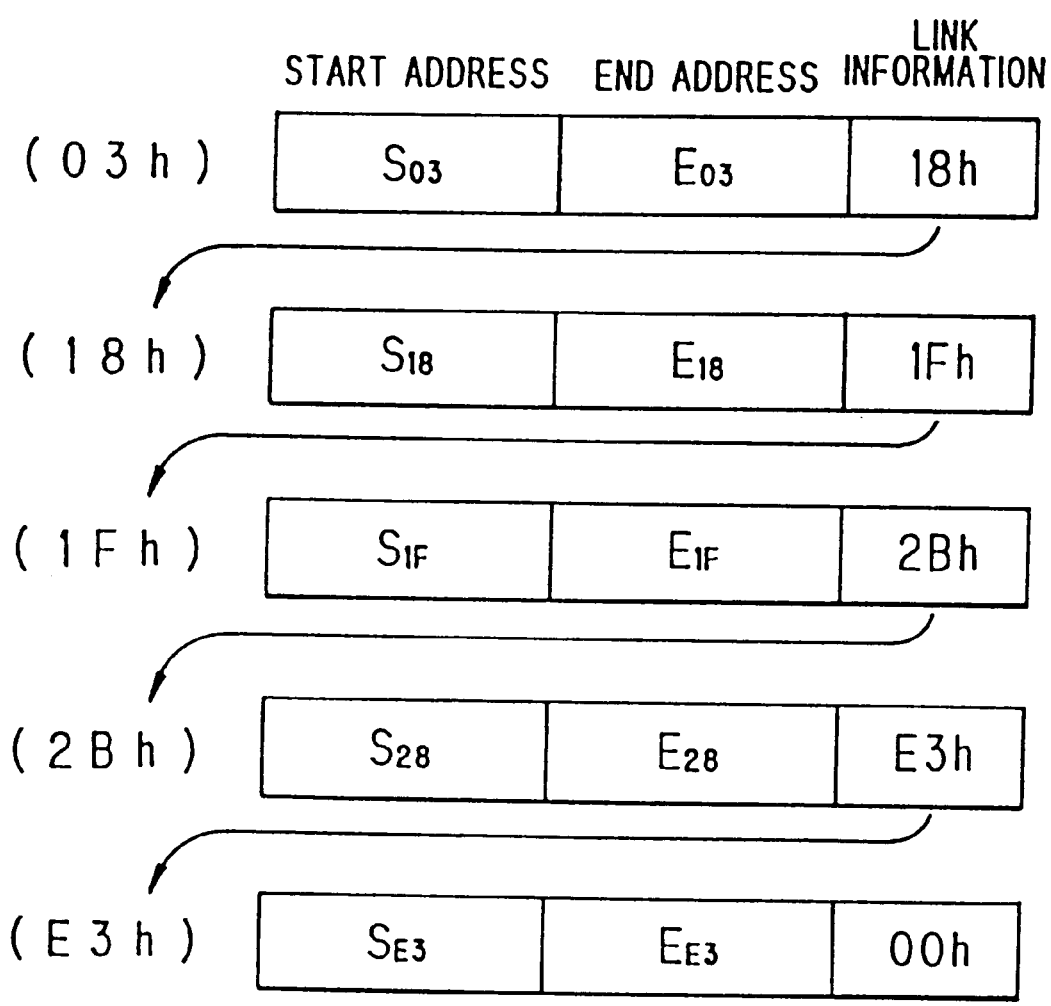
FIG. 12 is a schematic view illustrating the managing mode of the U-TOC information on the disc.

FIG. 12 schematically shows the management state of segments serving as free areas by the part tables. When each of segments (03h), (18h), (1Fh), (2Bh), (E3h) serve as a free area as shown in FIG. 12, this management state is represented by linkage of the part tables (03h), (18h), (1Fh), (2Bh), (E3h) in the corresponding table indicating data portion. The defective areas and the unused part tables can be managed in the same manner as described above.

The table pointers P-TNO1 to P-TNO255 represent the audio data for musical pieces which are recorded on the magneto-optical disc I by the user. For example, the table pointer P-TNO1 indicates a part table indicating a segment or a head segment of plural segments in which data of a first musical piece is recorded.

For example, when a first piece of music is recorded on the disc without dividing a track into sections (that is, with one segment), the recording area of the first musical piece is recorded with the start and end addresses of a part table which is indicated by the table pointer P-TNO1.

When a second piece of music is discontinuously recorded on plural segments of the disc, the respective segments indicating the recording position of the musical piece are successively indicated in a time order. That is, on the basis of the part table indicated by the table pointer P-TNO2, the other part tables are successively indicated by the link information in the time order, and finally linked to a part table whose link information is set to "(00h)", the same mode as shown in FIG. 12. As described above, the second musical piece is recorded with successively indicating all the segments in which the data of the second musical piece is recorded, so that the complete musical piece can be reconstructed from the discrete segments or the recording area can be effectively used through the access of the optical head 3 and the magnetic head 6 when the second musical piece is reproduced or the area of the second musical piece is over-written using the U-TOC sector 0.

As described above, the area management on the disc is carried out by the P-TOC, and the musical pieces (audio data) which are recorded in the recordable user area, the free areas, etc. are managed by the U-TOC.

The TOC information is read into the buffer RAM 13, and is accessed by the system controller 11. As described above, the U-TOC editing processing containing the merge processing for extinguishing trash areas is carried out, for example when the erasing operation is carried out. The memory control device and the memory data search circuit of this embodiment are constructed as being suitable for the above processing.

The memory control device of this embodiment is formed by the memory controller 12 under the control function of the system controller 11 in the recording and reproducing apparatus as shown in FIG. 8. The memory data search circuit of this embodiment is provided in the memory controller 12. The memory control device, the memory data search circuit and the executed editing processing of the U-TOC will be described with reference to FIGS. 13–24.

Figure 13:
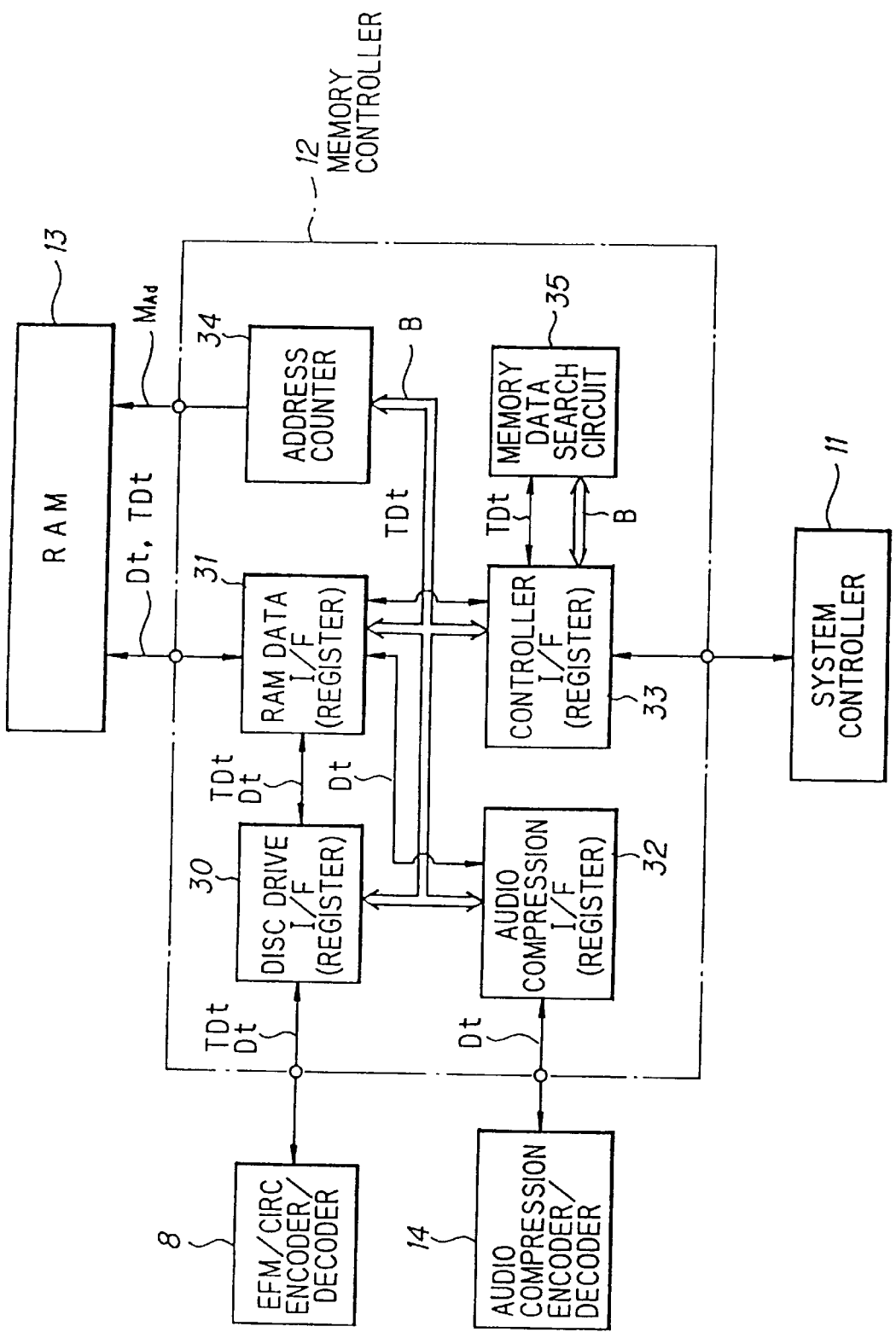
FIG. 13 is a block schematic diagram showing the memory control device and a peripheral circuit portion of an embodiment of the invention.

FIG. 13 is a block diagram showing the inner construction of the memory controller 12. Reference numeral 30 represents a disc drive interface unit, and serves to receive and hold record/reproduction data $D_t$ and TOC information $TD_t$ for the disc drive side, that is, the encoder/decoder unit 8.

A RAM data interface unit 31 serves to perform data write-in/read-out operations and hold the data for the buffer RAM 13. The data to be subjected to the write-in/read-out operations are the record/reproduction data $D_t$ and the TOC information $TD_t$. A reference numeral 32 represents an audio compression interface unit, and serves to receive and hold the record/reproduction data $D_t$ for the audio compression unit, that is, the encoder/decoder unit 14.

A controller interface unit 33 serves as an interface for the system controller 11. The controller interface unit 33 carries out reception and transmission of the TOC information $TD_t$ from and to the system controller 11, receives a control signal from the system controller 11, and holds this data.

An address counter 34 serves to generate a write-in address/read-out address (Mad) on the basis of the control signal from the system controller 11 and outputs this data to the buffer RAM 13. Reference numeral 35 represents a memory data search circuit, and upon input of various control signals from the system controller 11 through the controller interface unit 33, can carry out the search operation of the TOC information $TD_t$ stored in the buffer RAM 13 on the basis of the input control signals. "B" represents a control bus for connecting various parts to each other.

Figure 14:
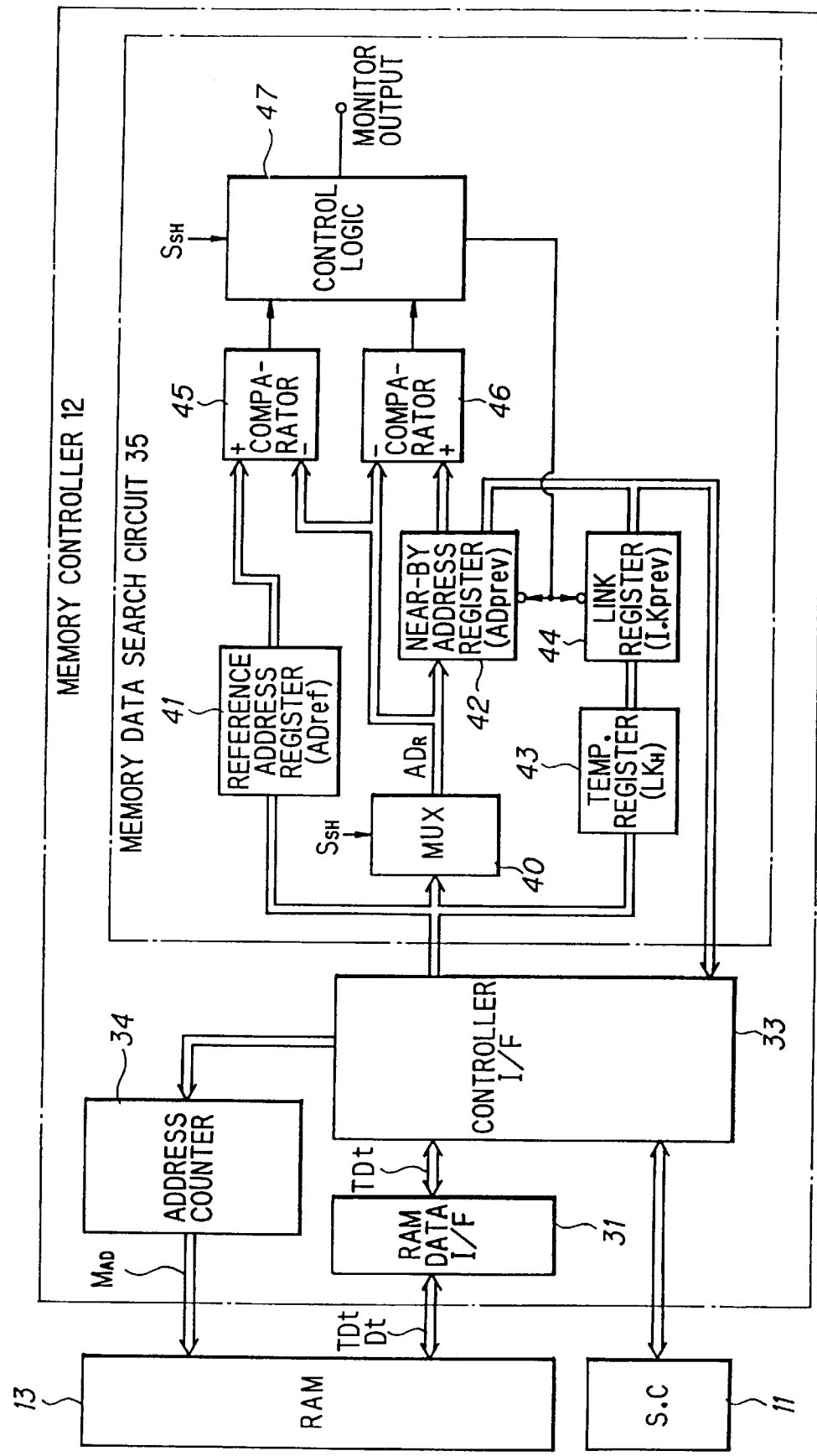
FIG. 14 is a block schematic diagram of the memory data search circuit and a peripheral circuit portion of an embodiment of the invention.

The construction of the memory data search circuit 35 is shown in FIG. 14. Reference numeral 40 represents an output selection unit, and reference numeral 41 represents a reference address register comprising a D flip-flop. In the reference address register 41 is set a reference address $AD_{ref}$ which is supplied through a controller interface unit 33 from the system controller 11. The start address or end address of a segment serving as a reference for U-TOC editing processing as described later corresponds to the above reference address $AD_{ref}$.

The output selection unit 40 selects a search target address $AD_R$ to be compared with the reference address $AD_{ref}$ from the data read (data in the part table of U-TOC) out from the buffer RAM 13 in the search operation as described later, and outputs it. Near-by address register 42 comprises a D flip-flop, and it is designed to latch the address $AD_R$ output from the output selection unit 40. The address $AD_{prev}$ which is latched by the near-by address register 42 finally becomes a search address which is obtained through the search processing of the memory data search circuit 34.

Temporary register 43 is input with the link information (or table pointer) recorded in the same part table as the search target address $AD_R$ which is output from the output selection unit 40. The temporary register 43, which has a two-staged register structure, for example, holds the current input link information and the previous input link information. The link information which was previously input and stored is set as search target part information $LK_R$. Link register 44 latches the search target part information $LK_R$ output from the temporary register 43 as search part information $LK_{prev}$. The link register 44 comprises a D flip-flop.

Comparator 45 compares the reference address $AD_{ref}$ latched in the reference address register 41 with the search target address $AD_R$ output from the output selection unit 40. Comparator 46 compares the search target address $AD_R$ output from the output selection unit 40 with the search address $AD_{prev}$ latched in the near-by address register 42.

Control logic 47 outputs a latch signal to the near-by address register 42 and the link register 44 on the basis of the comparison result of the comparators 45 and 46, thereby allowing the near-by address register 42 to carry out a renewing operation, that is, to renew the search target address $AD_R$ output from the output selection unit 40 to a new search address $AD_{prev}$, and allowing the link register 44 to execute a renewing operation of the search part information $LK_{prev}$ so that the search target part information $LK_R$ latched in the temporary register 43 is renewed to a new search part information $LK_{prev}$.

For example, when the editing of the U-TOC is carried out in accordance with the erasure of a music data, the segments located before (in front of) and after (behind) the segment of the erased music data (the segment serving as a reference for the editing) are searched. In this case, if any trash area exists, the merge processing of extinguishing the trash area is carried out (see FIGS. 3–7). By providing the memory data search circuit 35 as described above in the memory controller 12, the search processing of the segments before and after the editing reference segment (i.e., the segment serving as the reference for the editing) is executed by the memory data search circuit 35, and thus the system controller 11 is not required to execute the above search operation.

The merge processing when the U-TOC editing processing is carried out will be described with reference to the flowcharts of FIGS. 15 and 20. The merge processing is divided into a front merge processing (at an inner peripheral side of the disc) of the editing reference segment, and a rear merge processing (at an outer peripheral side of the disc) of the editing reference segment, and the respective processings of the system controller 11 for these front and rear merge processings will be individually described with reference to FIGS. 15 and 20, respectively.

Figure 15:
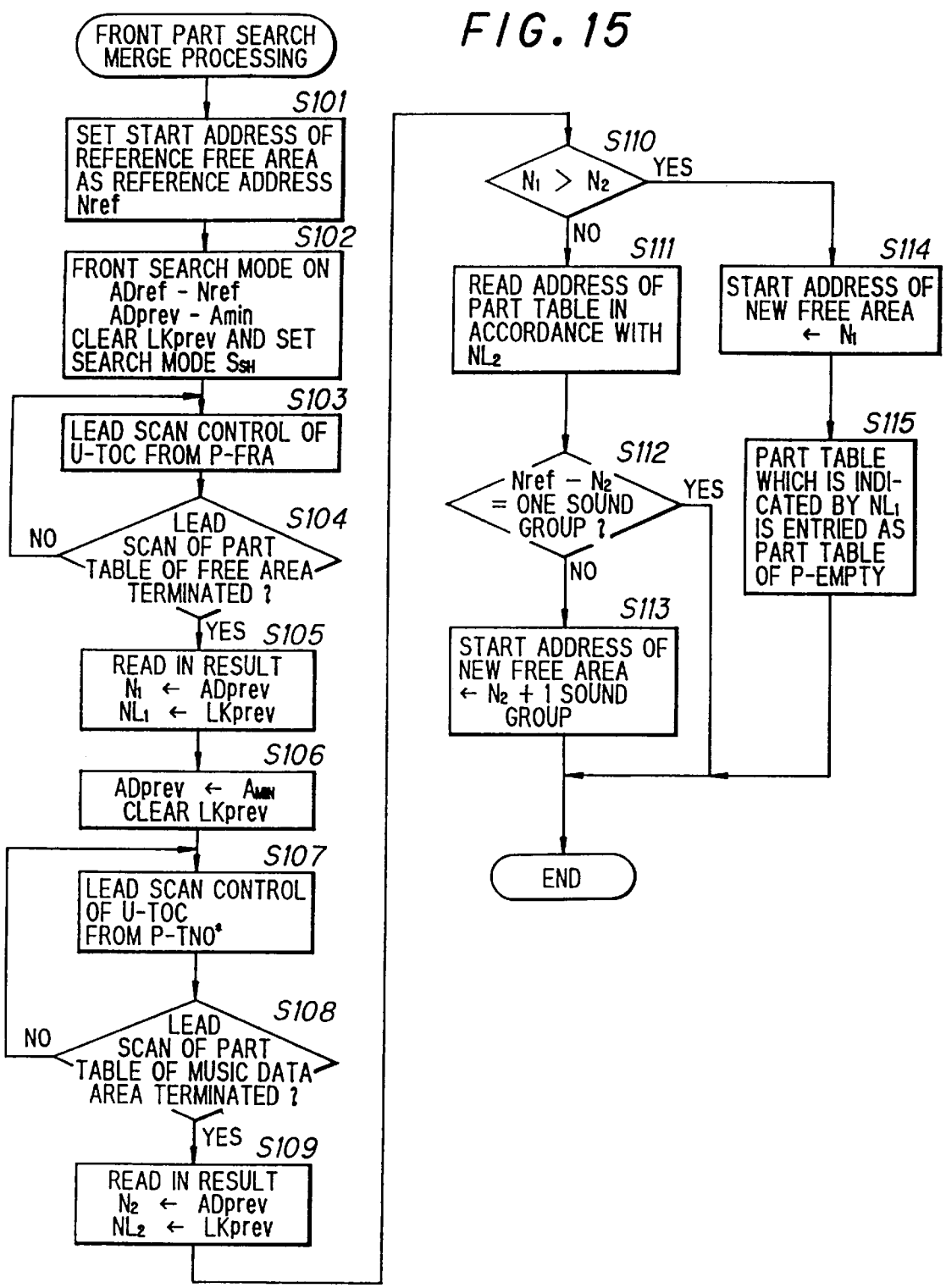
FIG. 15 is a flowchart for a front merge processing by the memory control device of an embodiment of the invention.

The processing of the system controller 11 for the front merge processing is carried out as shown in FIG. 15.

First, the system controller 11 sets as a reference address $N_{ref}$ the start address of a segment serving as a reference for the editing of a reference free area (S101). For example, it is assumed that as shown in FIGS. 16–19, the data of a piece of music is recorded in a segment (as indicated by oblique lines) of addresses $A_{26}$ to $A_{27}$ on the disc 1 and the merge processing is executed in accordance with the erasure of this music data. The segment between the addresses $A_{26}$ to $A_{27}$ serves as an editing reference segment, i.e., a reference free area, in place of the free area, the area on which the music data is erased, and the start address $A_{26}$ of the reference free area is set as a reference address $N_{ref}$.

Figure 16:
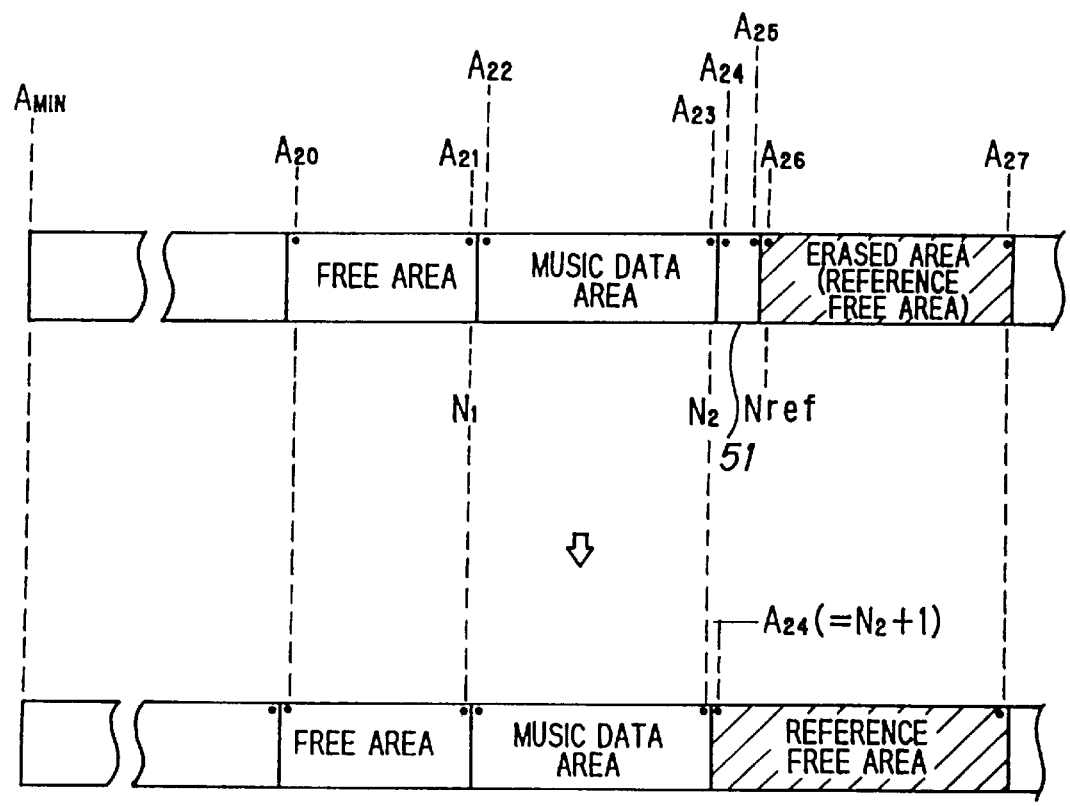
FIG. 16 is a schematic view of the front merge processing of date recorded on a disc in accordance with the invention.
Figure 17:
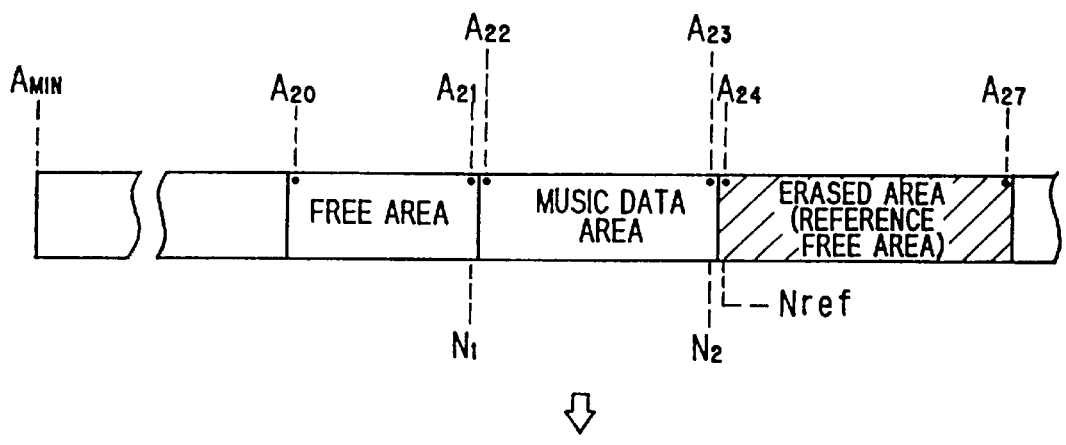
FIG. 17 is another schematic view of the front merge processing of data recorded on a disc in accordance with the invention.
Figure 18:
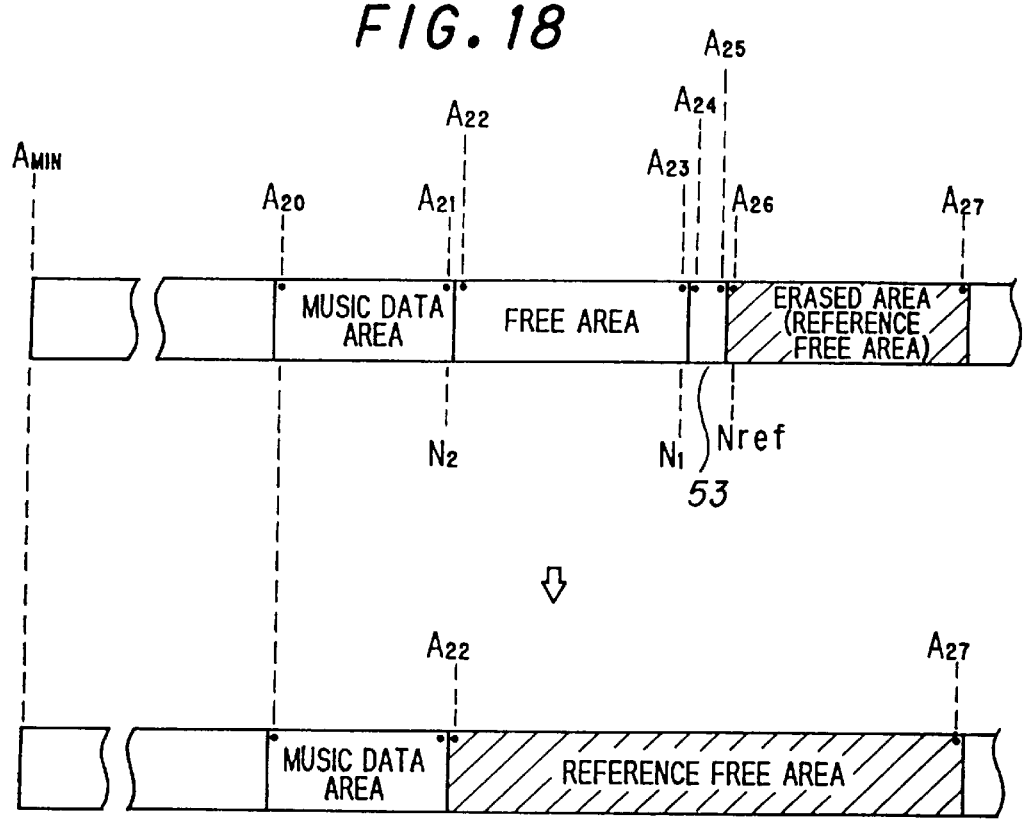
FIG. 18 is another schematic view of the front merge processing of data recorded on a disc in accordance with the invention.
Figure 19:
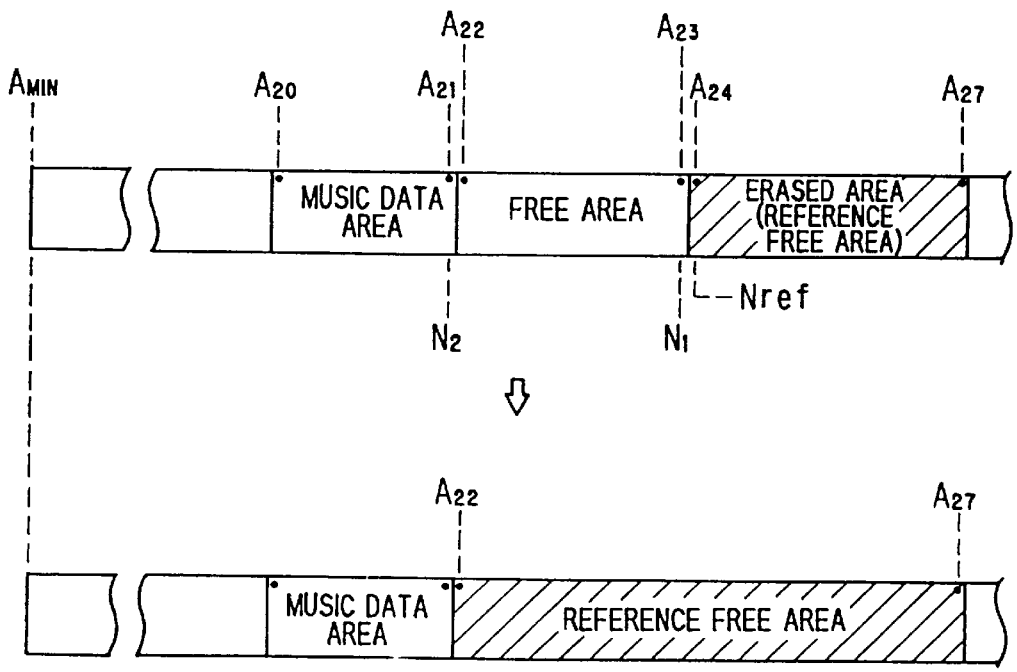
FIG. 19 is another schematic views of the front merge processing of data recorded on a disc in accordance with the invention.

FIGS. 16–19 show various cases for the area arrangement at the front side of the reference free area. FIG. 16 shows an area arrangement where a music-data recorded segment is located in front of a reference free area and a trash area 51 exists between the music-data recorded segment and the reference free area. FIG. 17 shows an area where a music-data recorded segment exists just in front of a reference free area and no trash area exists. FIG. 18 shows an area arrangement where a segment serving as a free area is located in front of a reference free area and a trash area 53 exists between the free area and the reference free area. FIG. 19 shows an arrangement where a segment serving as a free area exists just in front of a reference free area and no trash area exists. In the following front merge processing, one of the above area arrangements is identified for the current area arrangement, and the front merge processing is carried out in accordance with the identification result.

After the reference address $N_{ref}$ is set, the system controller 11 conducts a front search mode on the memory controller 12. That is, the memory controller 12 is controlled to identify or select the area arrangement in front of and adjacent to the reference free area from the area arrangements as shown in FIGS. 16, 17, 18, and 19 (S102).

Accordingly, the reference address $N_{ref}$ is supplied to the reference address register 41 of the memory data search circuit 35 through the controller interface unit 33, and also a latch control command is supplied thereto, whereby the reference address register 41 is controlled to hold the reference address $N_{ref}$ as the reference address $AD_{ref}$.

Likewise, the address $A_{MIN}$ is supplied as an initial value of the search address $AD_{prev}$ to the near-by address register 42, and latched in the register 42. The address $A_{MIN}$ is an address at the head position of the recordable user area as shown in FIG. 3. The search part information $LK_{prev}$ of the link register 44 is then cleared.

Next, the search mode signal $S_{SM}$ is output to the output selection unit 40 and the control logic 47. The search mode signal $S_{SM}$ is an identifier signal with which the memory data search circuit 35 judges whether it should execute the front merge processing or the rear merge processing.

Upon selectiof the search mode signal $S_{SM}$ indicating the front merge processing, the output selection unit 40 is set so that the end address of the address data of the part table in the read-in U-TOC is output as the search target address $AD_R$.

Further, on the basis of the search mode signal $S_{SM}$ indicating the front merge processing, the control logic 47 is so set as to output a latch control signal to the near-by address register 42 and the link register 44 when the relation of $AD_R < AD_{ref}$ is obtained through the comparison between the reference address $AD_{ref}$ and the search target address $AD_R$ in the comparator 45, and the relation of $AD_{prev} < AD_R$ is also obtained through the comparison between the search address $AD_{prev}$ and the search target address $AD_R$ in the comparator 46, thereby executing the renewing operation of the search address $AD_{prev}$ and the search part information $LK_{prev}$.

When switching on the front search mode for the memory controller 12 as described above, the system controller 11 first controls the execution of the search for those part tables which are derived from the table pointer P-FRA with respect to the U-TOC stored in the buffer RAM 13 (S03). That is, the system controller 11 controls the memory controller 12 to execute the lead scan of the part tables for the free areas, and waits for its operation until this lead scan is terminated (S104).

In the lead scan, the segment serving as a free area which is located in front of and nearest to the reference free area is searched in the memory data search circuit 35 of the memory controller 12.

That is, the memory controller 33 successively generates addresses for the part tables derived from the table pointer P-FRA by the address counter 34, and through this operation, the data of the part tables which target free areas are successively taken in through the RAM data interface unit 31. Here, the data taken in from one part table comprises a start address of 3 bytes, an end address of 3 bytes, a track mode information of one byte and a link information of one byte, totaling eight bytes.

When the memory data search circuit 35 takes this data through the controller interface unit 33, first, the link information is taken in the temporary register 43. In this case, the table pointer P-FRA is taken into the temporary register 43 when the lead scan is started, and the value of the table pointer P-FRA is held as previous link information in the temporary register at the time when the first part table is read in, so that the value of the table pointer P-FRA and the link information which is currently taken in are respectively held by the two-staged register structure. At this time, the temporary register 43 holds the value of the table pointer P-FRA as the search target part information $LK_R$.

Further, the end address recorded in the part table is output as the search target address $AD_R$ from the output selection unit 40.

The reference address $AD_{ref}$ (in this case, address A26) and the search target address $AD_R$ (the end address of the part table) are compared in the comparator 45.

Here, if $AD_R > AD_{ref}$, it indicates that the read-in part table corresponds to a part table for a segment located behind the reference free area. If $AD_R < AD_{ref}$, it indicates that the read-in part table corresponds to a part table for a segment located in front of the reference free area.

In the comparator 46, the search address $AD_{prev}$ (in this case, initially, the address $A_{MIN}$ which is an initial value) and the search target address $AD_R$, the end address of the read-in part table.

Here, if $AD_R > AD_{prev}$, it indicates that the currently read-in part table is for a segment located behind a segment whose end address corresponds to the search address $AD_{prev}$. If $AD_R < AD_{prev}$, it indicates that the read-in part table is for a segment located in front of a segment whose end address corresponds to the search address $AD_{prev}$.

With respect to those part tables which are read in at the stage where the search address $AD_{prev}$ has not yet been renewed, the search address ADprev to be compared is set to the initial value $A_{MIN}$, and thus the relation of $AD_R > AD_{prev}$ is satisfied at all times.

Here, if $AD_R < AD_{ref}$ in the comparator 45, when the search address $AD_{prev}$ is the initial value $A_{MIN}$, it results in $AD_R > AD_{prev}$ in the comparator 46, the read-in part table is identified as a part table which is located in front of the reference free area and indicates a segment serving a free area relatively near to the reference free area, and the control logic 47 outputs the latch control signal to the near-by address register 42 and the link register 44 to set the address $AD_R$ to a new search address $AD_{prev}$. Further, the control logic 47 controls the link register 44 to latch the search target part information $LK_R$ latched in the temporary register 43 as the search part information $LK_{prev}$.

Since the search target part information $LK_R$ in the temporary register 43 is the link information of the previously read-in part table (in this case, the value of the table pointer P-FRA), the search address $AD_{prev}$ in the near-by address register 42 is renewed as described above and at the same time the position information of the part table in which the end address serving as the value of the renewed $AD_{prev}$ is recorded is held as the search part information $LK_{prev}$ in the link register 44.

Through this operation, the end address of the segment in front of the reference free area is held as the search address $AD_{prev}$, and the position of the part table indicating the segment is indicated by the search link information $LK_{prev}$.

Subsequently, a part table linked from the part table is read in through the lead scan, and the link information of the part table is taken into the temporary register 43. At this time, the search target part information $LK_R$ in the temporary register 43 becomes the previously read-in link information, that is, the position of the currently taken-in part table on the U-TOC is indicated by the search target part information $LK_R$. Further, the end address of the part table is output as the search target address $AD_R$ from the output selection unit 40.

At this time, the search target address $AD_R$ and the reference address $AD_{ref}$ are compared with each other in the comparator 45, and the search target address $AD_R$ and the search address $AD_{prev}$ are compared with each other in the comparator 46. If $AD_R < AD_{ref}$ and $AD_R > AD_{prev}$, the read-in part table is identified as a part table for a segment which is in front of and nearer to the reference free area as compared with a part table in which the end address is held as the search address $AD_{prev}$ at this time point.

Accordingly, the control logic 47 controls the near-by address register 42 and the link register 44 to execute the latch operation and the renewing operation so that the search address $AD_{prev}$ is set to the end address in the read-in part table, and it is renewed to link information indicating the position of the read-in part table as the search part information $LK_{prev}$, that is, a value which is held as the search target part information $LK_R$ in the temporary register 43 at this time point.

Subsequently, the linked part tables are successively read in. The comparison operation of the comparators 45 and 46 is carried out every time the above read-in operation is carried out. If $AD_R < AD_{ref}$ and $AD_R > AD_{prev}$, the search address $AD_{prev}$ of the near-by address register 42 and the search part information $LK_{prev}$ of the link register 44 are renewed. On the other hand, if the result that $AD_R < AD_{ref}$ and $Ad_R > AD_{prev}$ is not obtained, the search address ADprev of the near-by address register 42 and the search part information $LK_{prev}$ of the link register 44 are not renewed, and they are kept to these values of the previous renewing operation.

Accordingly, when the above operation is carried out in accordance with the lead scan on all the part tables which are derived from the table pointer P-FRA in the memory data search circuit 35, the end address of a segment serving as a free area which is in front of and nearest to the reference free area at the time when the above operation is terminated is set as the search address $AD_{prev}$, and the part table indicating the segment is kept as the search part information $LK_{prev}$.

When the lead scan of the part tables from the table pointer P-FRA is terminated in the memory controller 12, the processing of the system controller 11 goes to a step S105 of FIG. 15 to take in the search address $AD_{prev}$ and the search part information $LK_{prev}$ which are held in the memory data search circuit 35. The search address $AD_{prev}$ is held as the near-by end address $N_1$, and the search part information $LK_{prev}$ is held as the near-by free area part information $NL_1$.

Subsequently, the system controller 11 sets the address $A_{MIN}$ as the search address $AD_{prev}$ serving as the initial value in the memory data search circuit 35 of the memory controller 12 again, and the search part information $LK_{prev}$ of the link register 44 is cleared (S106).

After the system controller 11 controls the memory controller 12 to perform the above setting of the memory data search circuit 35, the system controller 11 controls the memory controller 12 to successively execute the search operation of those part tables which are led by each of the table pointers P-TNO1 to P-TNO255 for the U-TOC held in the buffer RAM 13 (S107). That is, the memory controller 12 is controlled to execute the lead scan of the part tables for segments on which a piece of music is recorded (music data area), and the processing waits until the lead scan is terminated (S108).

Through the lead scan operation, the segment serving as the music data area which is in front of and nearest to the reference free area is searched in the memory data search circuit 35 of the memory controller 12.

That is, the memory controller 33 successively generates the addresses on the part tables which are led using the table pointer P-TNO1 by the address counter 34, and through this operation, the data of the part tables which target one or plural segments for a first piece of music are successively taken in through the RAM data interface unit 31. Here, the data which is taken in from one part table comprises a start address of 3 bytes, an end address of 3 bytes, a track mode information of 1 byte and a link information of 1 byte, totally, 8 bytes.

When the lead scan of the part tables for the first musical piece is terminated, subsequently part tables derived from the table pointer P-TNO2 for a second musical piece, and further subsequent part tables derived from the table pointer P-TNO3 for a third musical piece are successively subjected to the lead scan, and thus the part tables which correspond to the segments for all the recorded musical pieces are successively read out from the buffer RAM 13.

When taking in the data of these part tables through the controller interface unit 33, the memory data search circuit 35 executes the comparison processing for the end address of each segment and the holding of the previous link information like the part tables for the free areas. If $AD_R>AD_{prev}$ and $AD_R<AD_{ref}$ in accordance with the comparison result of the comparators 45 and 46, the read-in part table is judged to be a part table indicating a segment of a music data area which is located in front of and relatively near to the reference free area, and the control logic 47 outputs the latch control signal to the near-by address register 42 and the link register 44. Further, the address $AD_R$ is set as a new search address $AD_{prev}$ and the search target part information $LK_R$ latched in the temporary register 43 is latched as the search part information $LK_{prev}$ in the link register 44.

Next, the part tables are successively read in. Every time this read-in operation occurs, the comparison operation is carried out by the comparators 45 and 46. If $AD_R<AD_{ref}$ and $AD_R>AD_{prev}$, the search address $AD_{prev}$ of the near-by address register 42 and the search part information $LK_{prev}$ of the link register 44 are renewed. On the other hand, if the result that $AD_R<AD_{ref}$ and $AD_R>AD_{prev}$ is not obtained, the search address $AD_{prev}$ of the near-by register 42 and the search part information $LK_{prev}$ of the link register 44 are not renewed, and the values at the previous renewing operation are held without being renewed.

Accordingly, when in the memory data search circuit 35, the above operation is carried out in accordance with the lead scan of all the part tables which are led by the table pointers P-TNO1 to P-TNO255. Since no part table exists for a table pointer corresponding to "00h" out of the table pointers P-TNO1 to P-TNO255, the lead scan is not required, and for example when only three pieces of music are recorded, no lead scan is required for the table pointers P-TNO4 to P-TNO255. At the end time of the above operation, the end address of the segment which corresponds to a music data area in front of and nearest to the reference free area is held as the search address $AD_{prev}$, and the part table indicating the segment is held as the search part information $LK_{prev}$.

When the lead scan of the part tables from the table pointers P-TNO1 to P-TNO255 by the memory controller 12 is terminated, the processing of the system controller 11 goes to a step S109 of FIG. 15 to take in the search address $AD_{prev}$ and the search part information $LK_{prev}$ held in the memory data search circuit 35. The search address $AD_{prev}$ is held as a near-by music area address $N_2$, and the search part information $LK_{prev}$ is held as a near-by music data area part information $NL_2$.

At this time, the system controller 11 compares the near-by free area address $N_1$ and the near-by music data area address $N_2$ (S110). Through this comparison, it is determined whether the free area or the music data area is located in front of the reference free area.

For example, when the music data area exists just before the reference free area as shown in FIGS. 16 and 17, the near-by free area address $N_1$ corresponds to an address $A_{21}$, and the near-by music data area address $N_2$ corresponds to an address $A_{23}$, so that it is satisfied that $N_1<N_2$ (S110→Yes).

On the other hand, when the free area exists just before the reference free area as shown in FIGS. 18 and 19, the near-by free area address $N_1$, corresponds to the address $A_{23}$, and the near-by music data area address $N_2$ corresponds to the address $A_{21}$, so that it is satisfied that $N_1>N_2$ (S110→No).

When $N_1<N_2$ at the step S110 and a music data area exists in front of the reference free area, the system controller 11 reads the address of the part table in accordance with the near-by audio data part $NL_2$ (S111). Then, the near-by music data area address $N_2$ is subtracted from the reference address $N_{ref}$, and through this operation it is judged whether any trash area exists between the reference free area and the music data area just before the reference free area (S111).

If the difference between the near-by music data area address $N_2$ and the reference address $N_{ref}$ corresponds to the difference of one sound group, the reference free area and the music data area just before the reference free area are completely adjacent to each other, and no trash area exists. That is, the area arrangement as shown in FIG. 17 is identified. In this case, the merge processing for a trash area is not required, and thus the front merge processing is terminated (S112→YES).

On the other hand, if the difference between the near-by music data area address $N_2$ and the reference address $N_{ref}$ corresponds to the difference of two or more sound groups, a trash area 51 exists between the reference free area and the music data area just before the reference free area, as shown in FIG. 16, is identified. In this case, the merge processing for the trash area is executed (S112→S113).

As shown in FIG. 16, the start address of the reference free area is renewed from the address $A_{26}$ to the address $A_{24}$ and the renewed value is stored. The address $A_{24}$ is calculated on the basis of the calculation of the near-by music data area address $N_2+1$. Through this operation, the reference free area is completely adjacent to the just-before music data area in the system controller 11, and it is recognized as an area arrangement where no trash area exists.

If $N_1<N_2$ at the step S110 and any free area is located at a front side, the merge processing is executed without judging the presence or absence of any trash area (S110→S113). The merge process is explained below. The system controller 11 sets the near-by start address of free area N1 as the start address of new free area. (S114) And the system controller entries part table which is indicated by the near-by free area art information $NL_1$ as part table of P-Empty (S115). (Referring to FIG. 7.) That is, by combining the reference free area and the front free area with each other, even if any trash area exists, the trash area can be automatically extinguished.

For example in the case where the reference free area and the just-before free area are completely adjacent to each other and no trash area exists as in FIG. 19, the start address $A_{24}$ of the reference free area is identified as the start address $A_{22}$ of the free area, and the addresses $A_{22}$ to $A_{27}$ are identified as being allocated to a reference free area as shown in FIG. 19.

After the front merge processing and the rear merge processing as described later are terminated, the rewriting editing of the U-TOC is carried out. For the actual editing of the U-TOC, the end address of the part table in which the segment for a free area starting from the address $A_{22}$ is indicated is renewed from the address $A_{23}$ to the address $A_{27}$. However, when the free area is further combined with a free area at a rear side of the reference free area in the rear merge processing as described later, the end address of the part table having the address $A_{22}$ as the start address is rewritten to the end address of the rear free area.

When any trash area 53 exists between the reference free area and the just-before free area as shown in FIG. 18, the start address $A_{24}$ of the reference free area is recognized as the start address $A_{22}$ of the front free area, and the addresses $A_{22}$ to $A_{27}$ are newly identified as being allocated to the reference free area, so that the trash area is automatically extinguished.

When the front merge processing as described above is terminated, then the system controller 11 executes the rear merge processing for free areas and music data areas behind the reference free address.

Figure 20:
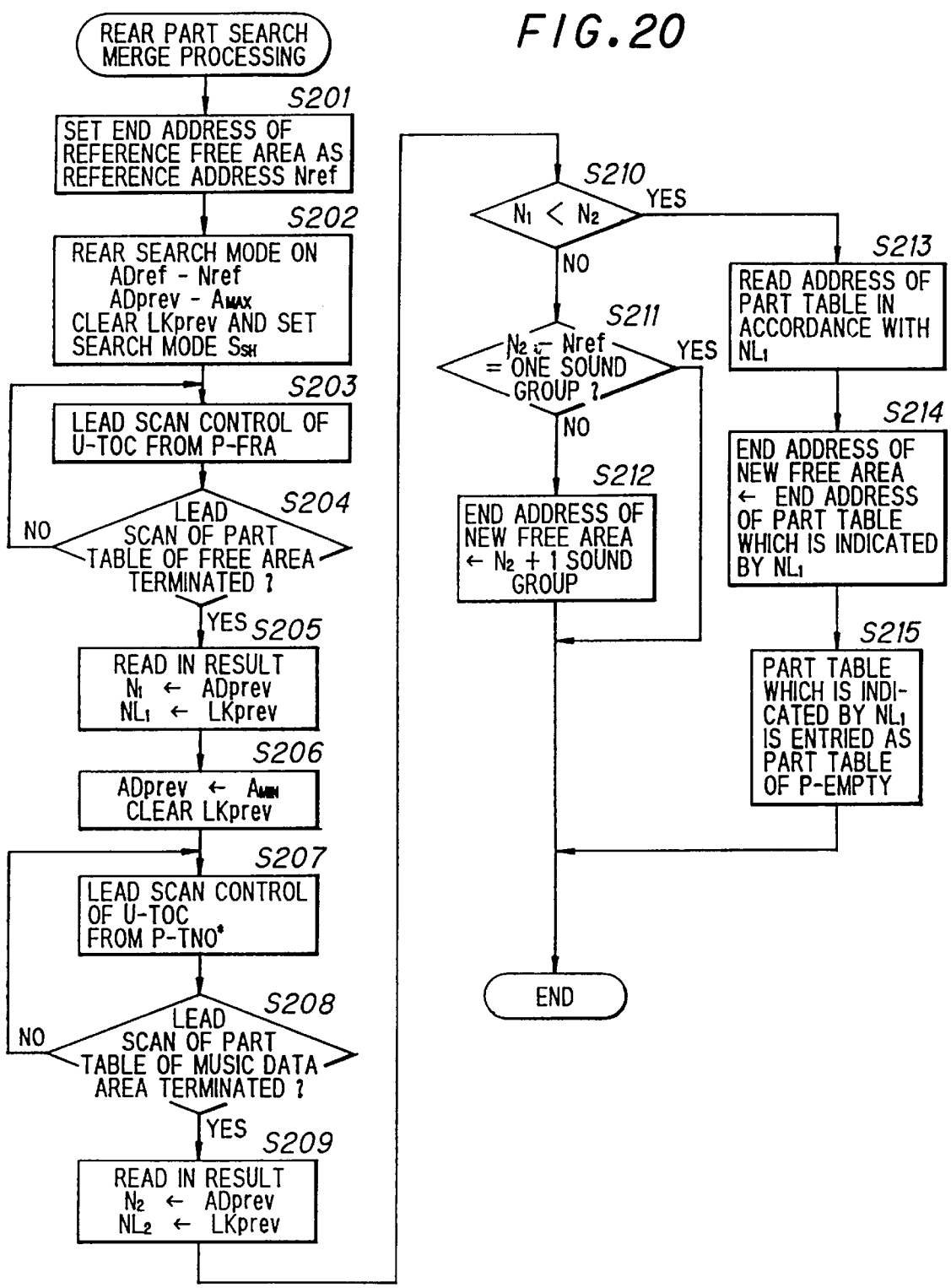
FIG. 20 is a flowchart of a rear merge processing by the memory control device of an embodiment of the invention.

The processing of the system controller 11 for the rear merge processing is shown in FIG. 20.

First, the system controller 11 sets the end address of an editing reference segment (a segment serving as an editing reference) as a reference address $N_{ref}$ (S201). For example when the segment of the addresses $A_{24}$ to $A_{27}$ or the segment of the addresses $A_{24}$ to $A_{29}$ is set as the above reference free area, indicated by oblique lines, after the front merge processing as described above as shown in FIGS. 21–24, the end address $A_{27}$ ($A_{29}$ in the case of FIG. 22) of the reference free area is set as the reference address $N_{ref}$.

Figure 21:
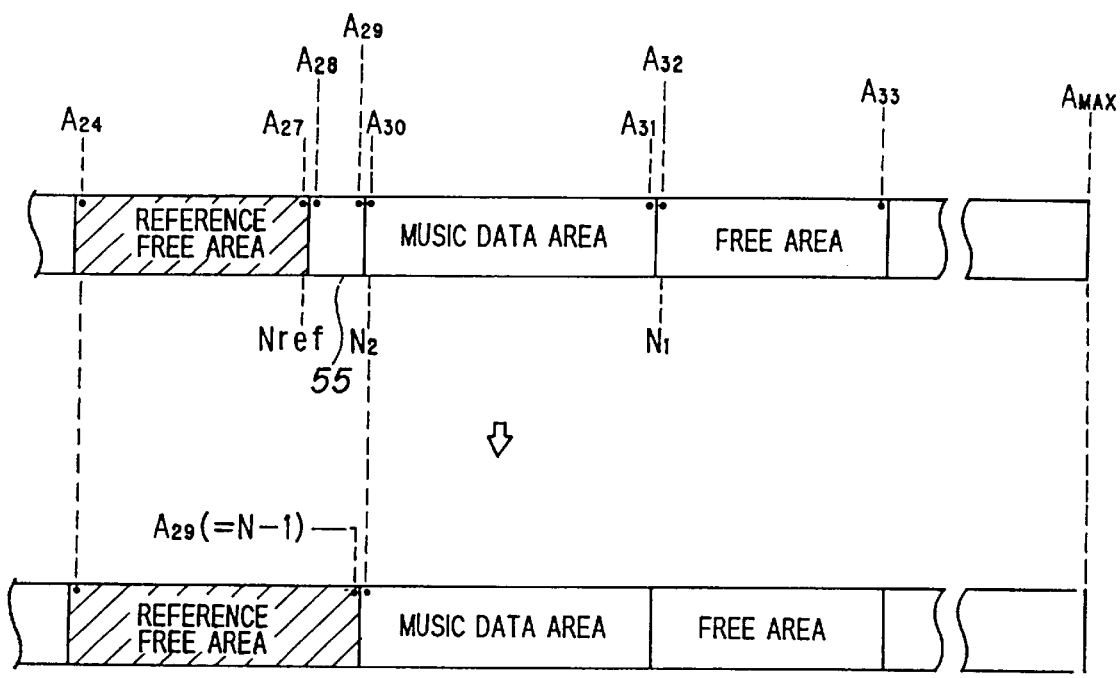
FIG. 21 is a schematic view of the rear merge processing in accordance with an embodiment of the invention.
Figure 22:
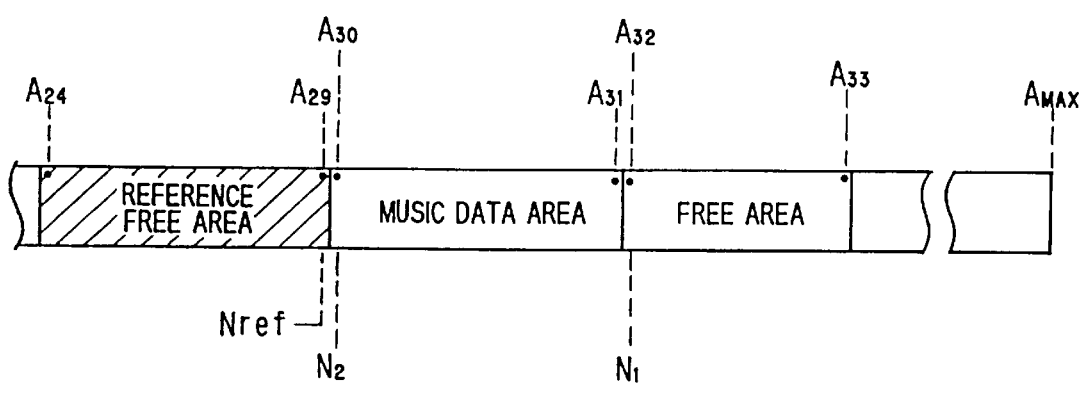
FIG. 22 is another schematic view of the rear merge processing in accordance with an embodiment of the invention.
Figure 23:
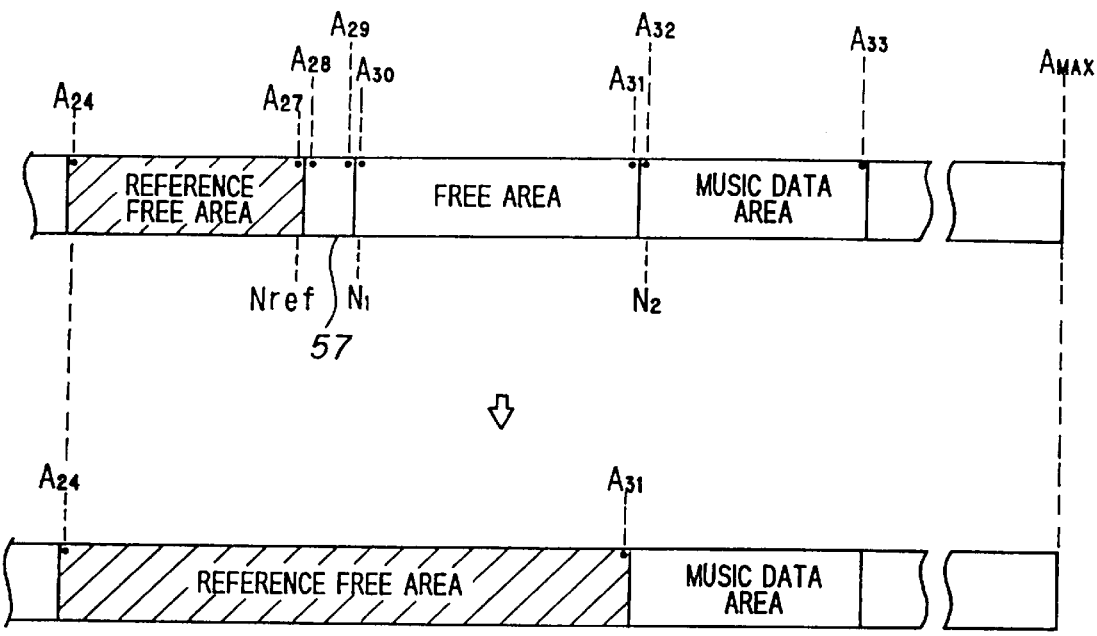
FIG. 23 is another schematic view of the rear merge processing in accordance with an embodiment of the invention.
Figure 24:
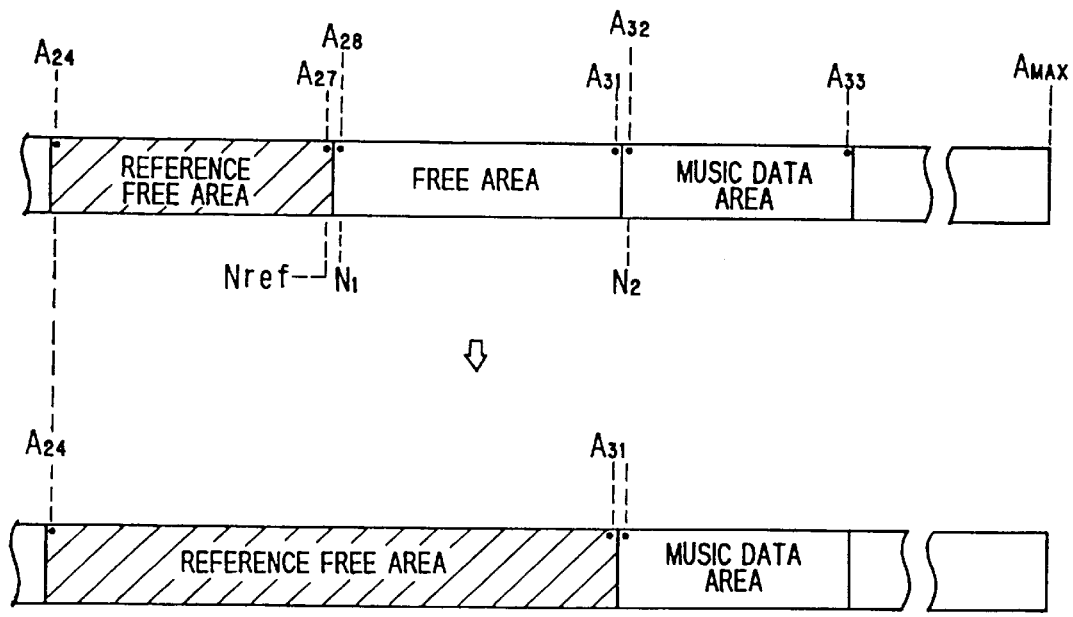
FIG. 24 is another schematic view of the rear merge processing in accordance with an embodiment of the invention.

FIGS. 21–24 show various area arrangements for the rear side of the reference free area. FIG. 21 shows an area arrangement where a segment in which recorded music data is located behind the reference free area and a trash area 55 exists between the music data area and the reference free area. FIG. 23 shows an area arrangement where a segment in which recorded music data is located just behind the reference free area and no trash area exists. FIG. 23 shows an area arrangement where a segment serving as a free area is located behind the reference free area and a trash area 57 exists between the free area and the reference free area. FIG. 24 shows an area arrangement where a segment serving as a free area is located just behind the reference free area and no trash area exists. In the rear merge processing as described below, the current area arrangement is identified as one of the above area arrangements and the rear merge processing is carried out in accordance with the identification result.

After setting the reference address $N_{ref}$ (S201), the system controller 11 executes a rear search mode for the memory controller 12. That is, the system controller 11 controls the memory controller 12 to identify one of the area arrangements as shown in FIGS. 21, 22, 23, and 24 in which the rear and adjacent position of the reference free area is kept (S202).

Accordingly, the reference address $N_{ref}$ and the latch control command are supplied to the reference address register 41 of the memory data search circuit 35 through the controller interface unit 33 of the memory controller 12, and the reference address register 41 is controlled to hold the reference address $N_{ref}$ as the reference address $AD_{ref}$. That is, the reference address corresponds to the end address of the reference free area which is opposite to the front merge processing in which the reference address corresponds to the start address of the reference free area.

Further, the address $A_{MAX}$ is supplied as an initial value to the near-by address register 42, and latched. The address $A_{MAX}$ is an address at the final position of the recordable user area as shown in FIG. 3, and it is located just before a read-out start address $RO_A$. The search part information $LK_{prev}$ of the link register 44 is then cleared (S202).

Next, the search mode signal $S_{SM}$ is output to the output selection unit 40 and the control logic 47. The search mode signal $S_{SM}$ in this case is a signal with which the memory data search circuit 35 identifies either the front merge processing or the rear merge processing to be executed. When the search mode signal $S_{SM}$ indicating the rear merge processing is supplied, the output selection unit 40 is set to output as the search target address $AD_R$ the start address of the address data of the read-in part table in the read-in U-TOC.

On the basis of the search mode signal $S_{SM}$ indicating the rear merge processing, the control logic is set to output the latch control signal to the near-by address register 42 and the link register 44 when the result of $AD_R > AD_{ref}$ is obtained through the comparison between the reference address $AD_{ref}$ and the search target address $AD_R$ in the comparator 45. Also, the result of $AD_{prev} > AD_R$ is obtained through the search address $AD_{prev}$ and the search target address $AD_R$ in the comparator 46, thereby executing the renewing operation of the search address $AD_{prev}$ and the search part information $LK_{prev}$.

Subsequently, when switching on the rear search mode, the system controller 11 controls the memory controller 12 to execute the search operation of the part tables let by the table pointer P-FRA of the U-TOC held in the buffer RAM 13 (S203). That is, the system controller 11 controls the memory controller 12 to execute the lead scan of the part tables for the free areas, and awaits its operation until the lead scan is terminated (S204).

Through the lead scan, the segment serving as a free area which is behind and nearest to the reference free area is searched in the memory data search 35 of the memory roller 12. The memory controller 33 successively generates the addresses for the part tables which are led from the table pointer P-FRA by the address counter 34, and through this operation the data of the part tables targeting free areas are successively taken in through the RAM data interface unit 31. That is, like the front merge processing, a start address of 3 byte, an end address of 3 byte, a track mode information of one byte and a link information of one byte, totally, data of 8 bytes are taken in. When the memory data search circuit 35 takes in this data through the controller interface unit 33, the link information is first stored in the temporary register 43.

At the start time of the lead scan, the table pointer P-FRA is stored into the temporary register 43. At the time when a first part table is read in, the value of the table pointer P-FRA is held as a previous link information in the temporary register 43, and the value of the table pointer P-FRA and the currently stored link information are held in the two-staged register structure. At this point in time, the temporary register 43 holds the value of the table pointer P-FRA as the search target part information $LK_R$.

From the output selection unit 40 is output the start address recorded in the part table therefor as the search target address $AD_R$. The reference address $AD_{ref}$ (in this case, address A27) and the search target address $AD_R$ (start address of the part table) are compared with each other in the comparator 45.

Here, if $AD_R > AD_{ref}$, the read-in part table is identified as a part table for a segment which is located behind the reference free area. On the other hand, if $AD_R < AD_{ref}$, the read-in part table is identified as a part table for a segment which is located in front of the reference free area. The comparator 46 compares the search address $AD_{prev}$, in this case, the address $A_{MAX}$ which is the initial value at the initial stage, and the search target address $AD_R$, the start address of the read-in part table.

If $AD_R > AD_{prev}$, the read-in part table corresponds to a segment located behind the segment whose start address corresponds to the search address $AD_{prev}$. On the other hand, if $AD_R < AD_{prev}$, the read-in part table corresponds to a segment located behind the segment whose start address corresponds to the search address $AD_{prev}$. However, for those part tables which are read in at the time when the search address $AD_{prev}$ has not yet been renewed, the search address $AD_{prev}$ to be compared is set as an initial value $A_{MAX}$, so that the relation of $AD_R < AD_{prev}$ is necessarily satisfied.

If $AD_R > AD_{ref}$ in the comparison unit 45 when the search address $AD_{prev}$ is the initial value $A_{MAX}$, the result of $AD_R < AD_{prev}$ is obtained in the comparator 46, the read-in part table is identified as a part table indicating a segment serving as a free area which is behind and relatively near to the reference free area, and the control logic 47 outputs the latch control signal to the near-by address register 42 and the link register 44 to set the address $AD_R$ as a new search address $AD_{prev}$ and to allow the link register 44 to latch the search target part information $LK_R$ latched in the temporary register 43 as the search part information $LK_{prev}$.

Since the search target part information $LK_R$ in the temporary register 43 is the link information (in this case, it may be the value of the table pointer P-FRA) in the part table which is previously read in, as describe above the search address $AD_{prev}$ in the near-by address register 42 is renewed and at the same time the position information of the part table in which the end address serving as the value of the renewed $AD_{prev}$ is recorded is held as the search part information $LK_{prev}$ in the link register 44.

Through this operation, the start address of the segment which is behind the reference free area is held as the search address $AD_{prev}$, and the position of the part table indicating the segment is indicated as the search link information $LK_{prev}$.

Subsequently, part tables linked to the part table are read in accordance with the lead scan, and the link information of the part table is taken into the temporary register 43. At this time, the search target part information $LK_R$ in the temporary register 43 is set to the previously taken-in link information, that is, the position of the currently stored part table on the U-TOC is indicated by the search target part information $LK_R$. Next, the start address of the part table is output as the search target address $AD_R$ from the output selection unit 40.

At this time, the search target address $AD_R$ and the reference address $AD_{ref}$ are compared with each other in the comparator 45, and the search target address $AD_R$ and the search address $AD_{prev}$ are compared with each other in the comparator 46. If the result is that $AD_R > AD_{ref}$ and $AD_R < AD_{prev}$, the read-in part table becomes a part table for a segment which is located behind and nearer to the reference free area than a part table whose start address is held as the search address $AD_{prev}$ at the above time point.

Accordingly, the control logic 47 controls the near-by address register 42 and the link register 44 to execute the latch operation, renew the search address $AD_{prev}$ to be the start address of the search part information $LK_{prev}$, and renew to the link information indicating the position of the read-in part table as the search part information $LK_{prev}$, that is, the value which is held as the search target part information $LK_R$ in the temporary register 43 at this time point.

Subsequently, the linked part tables are successively read in. The comparison operation is executed every read-in operation in the comparator 45, 46 as described above, and if the result is that $AD_R > AD_{ref}$ and $AD_R < AD_{prev}$, the search address $AD_{prev}$ of the near-by address register 42 and the search part information $LK_{prev}$ of the link register 44 are renewed. On the other hand, if the result that $AD_R > AD_{ref}$ and $AD_R < AD_{prev}$ is not obtained, the search address $AD_{prev}$ of the near-by address register 42 and the search part information $LK_{prev}$ of the link register 44 are not renewed, and the values at the previous renewing time are kept.

Accordingly, when the above operation is carried out for all the part tables lead by the table pointer P-FRA through the lead scan in the memory data search circuit 35, the start address of the segment serving as the free area which is located behind and nearest to the reference free area is held as the search address $AD_{prev}$, and the part table indicating the segment is held as the search part information $LK_{prev}$ at the time when the above operation is terminated.

After the lead scan of the part tables from the table pointer P-FRA by the memory controller 12 is terminated, the processing of the system controller 11 goes to a step S205, and the search address $AD_{prev}$ and the search part information $LK_{prev}$ which are held in the memory data search circuit 35 are taken in. The search address $AD_{prev}$ is held as a near-by free area address $N_1$, and the search part information $LK_{prev}$ is held as a near-by free area part information $NL_1$.

Subsequently, the system controller 11 sets the memory data search circuit 35 of the memory controller 12 again so that the address $A_{MAX}$ serving as an initial value is set as the search address $AD_{prev}$ to the near-by address register 42, and the search part information $LK_{prev}$ of the link register 44 is cleared (S206).

After the system controller 11 carries out the above setting of the memory data search circuit 35 for the memory controller 12, the system controller 11 controls the memory controller 12 to successively execute the search operation of those part tables which are led by each of the table pointers P-TNO1 to P-TNO255 of the U-TOC held in the buffer RAM 13 (S208). That is, the memory controller 12 is controlled to execute the lead scan for the part tables for the segment (music data area) in which a music data is recorded, and the processing waits until the lead scan is terminated (S209).

Through this lead scan, the segment serving as a music data area which is behind and nearest to the reference free area is searched in the memory data search circuit 35 of the memory controller 12. That is, the memory controller 33 successively generates addresses for part tables led by the table pointer P-TNO1 by the address counter 34, whereby the data of part tables for one or plural segments for the first musical piece are successively taken in through the RAM data interface unit 31. The data which is taken in from one part table comprises a start address of 3 bytes, an end address of 3 bytes, a track mode information of one byte and a link information of one byte, totally, 8 bytes.

When the lead scan of the part tables for the first musical piece is terminated, the lead scan is successively carried out such that part tables led by the table pointer P-TNO2 for the second musical piece, and then part tables led by the table pointer P-TNO3 and subsequent part tables are carried out. Accordingly, the part tables for the segments in which all musical pieces are recorded are successively read out from the buffer RAM 13.

When the memory data search circuit 35 takes in the data of these part tables through the controller interface unit 33, the comparison processing for the start address of each segment is carried out and the previous link information are held like the part tables for the free area as described above. If $AD_R < AD_{prev}$ and $AD_R > AD_{ref}$ in accordance with the comparison result of the comparators 45 and 46, the read-in part table is identified as a part table indicating a segment for a music data area which is located behind and relatively near to the reference free area, and the latch control signal is output from the control logic 47 to the near-by address register 42 and the link register 44, whereby the address $AD_R$ is set as a new search address $AD_{prev}$ and the search target part information $LK_R$ latched in the temporary register 43 is latched as the search part information $LK_{prev}$ in the link register 44.

Next, the part tables are successively read in. Every time the read-in operation is carried out, the comparison operation of the comparators 45 and 46 is executed. If the result of $AD_R > AD_{ref}$ is obtained and $AD_R < AD_{prev}$, the search address $AD_{prev}$ of the near-by address register 42 and the search part information $LK_{prev}$ of the link register 44 are renewed. On the other hand, if the result of $AD_R > AD_{ref}$ and $AD_R < AD_{prev}$ is not obtained, the search address $AD_{prev}$ of the near-by address register 42 and the search part information $LK_{prev}$ of the link register 44 are not renewed and the values of the previous renewing operation are kept without being renewed.

The above operation is executed in the memory data search circuit 35 through the lead scan for all the part tables which are led by the table pointer P-TNO1 to P-TNO255. Of course, in this case, no part table exists for the table pointer of "00h" of P-TNO1 to P-TNO255, and thus the lead scan is not required. At the time when the above operation is terminated, the start address of the segment serving as a music data area which is behind and nearest to the reference free area is held, and the part table indicating the segment is held as the search part information $LK_{prev}$.

When the lead scan of the part tables from the table pointer P-TNO1 to P-TNO255 by the memory controller 12 is terminated, the processing of the system controller 11 goes to a step S209 of FIG. 15 to take in the search address $AD_{prev}$ and the search part information $LK_{prev}$ held in the memory data search circuit 35. Further, it holds the search address $AD_{prev}$ as the near-by music data area address $N_2$ and the search part information $LK_{prev}$ as the near-by music data area part information $NL_2$.

At this point in time, the system controller 11 compares the near-by free area address $N_1$ and the near-by music data area address $N_2$ (S210). Through this comparison, it is found out whether a free area or a music data area exists behind the reference free area.

For example, when any music data area exists behind the reference free area as shown in FIGS. 21 and 22, as shown in the figure, the near-by free area address $N_1$ corresponds to the address $A_{32}$, and the near-by music data area address $N_2$ corresponds to the address $A_{30}$, that is, $N_1 > N_2$. (S210→S211)

On the other hand, when any free area exists behind the reference free area as shown in FIGS. 23 and 24, the near-by free area address $N_1$ corresponds to the address $A_{30}$ or $A_{28}$, and the near-by music data area address $N_2$ corresponds to the address $A_{32}$, that is, $N_1 < N_2$. (S210→S213)

If $N_1 > N_2$ at the step S210 and a music data area is judged to be located at the rear side, then the reference address $N_{ref}$ is subtracted from the near-by music data area address $N_2$ to thereby judge whether any trash area exists between the reference free area and the music data area behind the reference free area (S211).

If the difference between the near-by music data area address $N_2$ and the reference address $N_{ref}$ corresponds to one sound group, then the reference free area is completely adjacent to the music data area behind the reference free area, and no trash area exists. That is, the state as shown in FIG. 22 is identified. In this case, no merge processing for the trash area is required, and thus the rear merge processing is terminated (S211→YES).

If the difference between the near-by music data area address $N_2$ and the reference address $N_{ref}$ corresponds to two more sound groups, then a trash area exists between the reference free area and the music data area behind the reference free area, and the state as shown in FIG. 21 is identified.

In this case, the merge processing for the trash area is executed (from S211 to S212). That is, the end address of the reference free area as shown in FIG. 21 is renewed from the address $A_{27}$ to the address $A_{29}$ and held. This address $A_{29}$ is determined by calculation of the near-by music data area address $N_2 - 1$. (sound group) Through this operation, the system controller 11 is recognized to be in the state where the reference free area is completely adjacent to the music data area behind the reference free area and the trash area is extinguished.

If at the step S210 $N_1 < N_2$ a free area is judged to be located at the rear side, the merge processing is executed without judging the presence or absence of the trash area (from S210→S213). The merging process is explained below. The system controller 11 reads the address of the part table in accordance with the near-by free area information $NL_1$. (S213). The system controller gets the end address of the part table which is indicated by the near-by free area part information $NL_1$ as the end address of the new free area (S214). The system controller 1 accesses the part table which is indicated by the nearby free area part information $NL_1$ as part of table P-Empty, referring to FIG. 7. Thus, by combining the reference free area and the free area at the rear side of the reference free area with each other, even if any trash area exists, the trash area is automatically extinguished.

For example when the reference free area and the free area behind the reference free area are completed adjacent to each other and no trash area exists, the address $A_{27}$ of the reference free area is identified as the end address $A_{31}$ of a free area behind the reference free area, and the addresses $A_{24}$ to $A_{31}$ are newly identified as the reference free area as shown in FIG. 24.

In the above description, only the rear merge processing is described. Of course, when the reference free area is combined with a free area in front of the reference free area as shown in FIGS. 18 and 19 in the front merge processing, the start address of the reference free area at this time is identified as the start address of the free area in front of the reference free area.

After these merge processings, for the actual editing of the U-TOC, the reference free area identified in the above merge processings is indicated with being contained in the part table which has been provided in correspondence with the segment serving as a free area at a front or rear side.

Even when any trash area exists between the reference free area and a free area behind the reference free area as shown in FIG. 23, the end address $A_{27}$ of the reference free area is likewise identified as the end address $A_{31}$ of the rear free area, and the addresses $A_{24}$ to $A_{31}$ are newly identified as the reference free area as shown in FIG. 23, whereby the trash area can be automatically extinguished.

After the front merge processing and the rear merge processing as described above are terminated, the system controller 11 executes the editing operation of the U-TOC on the basis of the merge processing to rewrite the U-TOC in the buffer RAM 13.

In FIG. 14, for example, the U-TOC of FIG. 4 is edited and rewritten as shown in FIG. 7. A predetermined time point, the edited U-TOC is supplied as recording data to the disc 1, and the U-TOC is rewritten on the disc 1. As described above, by carrying out the merge processing to edit the U-TOC, the trash area is extinguished, and the recordable user area on the disc 1 can be effectively used.

As described above, the system controller 11 is not required to receive the data of part tables which are subjected to the lead scan and to carry out comparison processing of the neighboring segment. Accordingly, the time which is required for the communication of the lead scan data between the conventional system controller 11 and the conventional memory controller 12 is completely unrequired, so that the merge processing can be rapidly performed. For example, the U-TOC editing processing time which conventionally takes about two minutes can be shortened to about two seconds.

Further, the system controller 11 supplies the search mode signal $S_{SM}$ to the output selection unit 40 of the memory data search circuit 35 to output the end address in the front merge processing and output the start address in the rear merge processing, whereby the end address is set as the search address in the front merge processing and the start address is set as the search address in the rear merge processing. Therefore, the search address can be used to judge the presence or absence of any trash area, and thus the efficiency of the processing can be improved.

In the above embodiment, the front merge processing is executed first, however, the rear merge processing may be carried out first. Further, the front and rear merge processings may be simultaneously carried out to shorten the processing time more. In the case where the front and rear merge processing are simultaneously carried out, two units of memory data search circuits 36 for the front search and the rear search respectively must be provided in the memory controller 12.

The output selection unit 40 and the control logic 47 in the memory data search circuit 35 supply the search mode signal $S_{SM}$ to perform a judgment setting on the operation in the front merge processing and the operation in the rear merge processing. The operation of the output selection unit 40 is controlled to output the end address in the merge processing and output the start address in the rear merge processing, thereby improving the efficiency of the processing. However, this is not necessarily required.

The output selection unit 40 is controlled to output the end address in the front merge processing. However, it may output the start address. That is, the same result can be obtained even by carrying out the comparison using the start address if the processing is limited to the seeking of a segment in front of the reference free are and the judgment is made as to whether the segment is for a music data area or a free area. In this case, with respect to the judgment as to whether any trash area exists between the searched front segment and the reference free area, the system controller 11 takes in the search part information $LK_{prev}$ which is taken in as the near-by free area part information $NL_1$ or the near-by music data area part information $NL_2$ and thus by reading out the part table indicated by the information, the end address of the front segment can be obtained. Accordingly, by comparing the reference address $N_{ref}$ and the end address of the front segment, it can be judged whether any trash area exists.

For the same reason, the output selection unit 40 may output the end address, not the start address, in the rear merge processing. It is not necessarily required to carry out the operation of the output selection unit 40 in accordance with the search mode signal $S_{SM}$ in some processing modes.

Likewise, the control logic may not be operated in accordance with the search mode signal $S_{SM}$. The search of the front and rear segments as described above is realized by designing the control logic 47 so as to output the latch control at the time when the inequality of $AD_{prev} < AD_R < AD_{ref}$ (that is, the latch condition in the front merge processing) or $AD_{prev} > AD_R > AD_{ref}$ (that is, the latch condition in the rear merge processing) is satisfied, in the case where, in the near-by address register 42, $A_{MIN}$ is properly set as an initial value before the front merge processing is started, and $A_{MAX}$ is properly set as an initial value before the rear merge processing is started.

In this embodiment, the position information of the part tables of the segments located adjacently at the front or rear side is obtained as the search part information $LK_{prev}$ from the link register 44. This is not necessarily required for the merge processing of the above embodiment. That is, the memory data search circuit 35 may not be provided with the temporary register 43 and the link register 44.

However, in the actual merge processing (steps S112, S113, S212, S213) and the editing processing of the U-TOC, the position information of the part tables for the adjacent segments are detected and obtained by the memory data search circuit 35, and the processing can be effectively executed. The execution of the above merge processing is not limited to the time when the erasing is carried out.

The above embodiment is described for the case where the memory control device and the memory data search circuit are applied to the recording and reproducing device for the magneto-optical disc 1. However, this invention is applicable as the memory control device and the memory data search circuit to a device exclusively used for recording and other equipments.

As described above, according to this invention, by providing the memory data search circuit for executing the operation of judging the managing information corresponding to the segment which is in front of or behind the segment on the recording medium which serves as a reference for an editing operation through the search and comparing processing of the managing information (U-TOC) in the memory controller, the data to be searched (that is, data of part tables in the U-TOC) itself is not required to carry out the communication with the system controller, and the time for the data communication is not required in the editing processing. Therefore, the processing time can be greatly shortened.

Further, the system controller requires no processing to search adjacent segments through the data comparison, so that the processing load of the system controller can be greatly reduced.

Still further, the system controller supplies the search mode signal $S_{SM}$ to the output selection unit 40 in the memory data search circuit 35 so that the end address is output in the front merge processing and the start address is output in the rear merge processing, whereby finally the end address is set as the search address in the front merge processing and the start address is set as the search address in the rear merge processing. Accordingly, the search address can be directly used for the judgment of on the presence or absence of trash areas, and thus the efficiency of the processing can be improved.

The system controller controls the memory data search circuit to execute the search operation as follows: in order to search the managing information corresponding to the segment located in front of the reference segment, the end address of each segment in the managing information is searched, while in order to search the managing information corresponding to the segment located behind the reference segment, the start address of each segment is searched. Accordingly, the search address can be directly used to judge the presence or absence of any trash area, so that the efficiency of the processing can be improved.

Further, as described above, the memory data search circuit is equipped with the reference data register, the output selecting element, the search data register element, the search target data position register, the search data position register, the first comparing element, the second comparing element, and the renewing control element, whereby the segment located at a front or rear side and the position of the part table of the segment can be accurately searched.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A memory data search circuit for processing management information relating to information stored on a recording medium, the memory data search circuit comprising:

a memory for storing the management information at addresses in the memory;

reference data register means for holding reference data serving as a search reference;

output selection means for extracting search target data from data read out from the memory through a search operation and outputting the extracted search target data;

search target data register means for holding the search target data output from the output selection means as search data;

search target data position register means for holding position information of the search target data in accordance with the search target data output from the output selection means;

search data position register means for holding the position information of the search data in accordance with the search data held in the search data register means;

first comparing means for comparing the reference data held in the reference data register means with the search target data output from the output selection means;

second comparing means for comparing the search data held in the search data register means with the search target data output from the output selection means; and renewing control means for allowing the search target data output from the output selection means to be held in the search data register means on the basis of comparison results of the first and second comparing means to thereby renew the search data in the search data register means, and allowing the search target data position information held in the search target data position register means to be held in the search data position register means to thereby renew the search data position information in the search data position register means.

2. The memory data search circuit according to claim 1 wherein the search target data comprises at least one of a start address, an end address, and link information.

3. The memory data search circuit according to claim 1 wherein the reference data indicates a start address of search target data on the recording medium.

4. The memory data search circuit according to claim 1 wherein the reference data indicates an end address of search target data on the recording medium.

* * * * *